US008074185B2

(12) United States Patent
Sherwood et al.

(10) Patent No.: US 8,074,185 B2
(45) Date of Patent: Dec. 6, 2011

(54) SYSTEM AND METHOD FOR DISPLAYING AND MANIPULATING HIERARCHICALLY LINKED DATA IN A GENEALOGY DATABASE USING A GRAPHICAL INTERFACE

(75) Inventors: John H. Sherwood, Farmington, UT (US); Michael C. Miller, Farmington, UT (US)

(73) Assignee: Sherwood Electronics Laboratories, Inc., Farmington, UT (US)

( * ) Notice: Subject to any disclaimer, the term of this patent is extended or adjusted under 35 U.S.C. 154(b) by 793 days.

(21) Appl. No.: 12/120,723

(22) Filed: May 15, 2008

(65) Prior Publication Data

US 2008/0288886 A1    Nov. 20, 2008

Related U.S. Application Data

(60) Provisional application No. 60/938,260, filed on May 16, 2007.

(51) Int. Cl.
*G06F 3/00* (2006.01)
*G06F 9/00* (2006.01)
*G06F 17/00* (2006.01)

(52) U.S. Cl. .................. 715/854; 715/853; 715/764

(58) Field of Classification Search .......... 715/762, 715/763, 764, 765, 744, 853, 854, 825, 826, 715/969

See application file for complete search history.

(56) References Cited

U.S. PATENT DOCUMENTS

| 4,501,559 | A | * | 2/1985 | Griswold et al. | 434/154 |
|---|---|---|---|---|---|
| 6,373,488 | B1 | * | 4/2002 | Gasper et al. | 345/427 |
| 6,570,567 | B1 | | 5/2003 | Eaton | |
| 2002/0032687 | A1 | * | 3/2002 | Huff | 707/104.1 |
| 2004/0017402 | A1 | * | 1/2004 | Bardon et al. | 345/823 |
| 2005/0114302 | A1 | * | 5/2005 | Lee et al. | 707/3 |
| 2007/0061424 | A1 | * | 3/2007 | Mattaway | 709/219 |

* cited by examiner

*Primary Examiner* — Tadeese Hailu
*Assistant Examiner* — Anita D Chaudhuri
(74) *Attorney, Agent, or Firm* — Austin Rapp & Hardman

(57) ABSTRACT

A system and method for displaying, searching, manipulating and modifying of hierarchically linked genealogy data in a relational database on a computer system. A graphic representation of the data in the database is displayed on a computer display device. The system uses zooming, a common function used in computer systems, to show more or less information in the database in readable form. Using the computer pointer devices, the data in the database can be manipulated, added, deleted, or moved. The system allows for changing of the root node individual thereby giving a different view of the database, to zoom in or zoom out and save that view of the database for future reference. The system displays all relationships of the data in the hierarchical structure by use of various sizes and type of lines and positions in the structure and shows for example data further away from the root node individual as a progressively smaller graphical image.

16 Claims, 31 Drawing Sheets

SYSTEM AND METHOD FOR DISPLAYING AND MANIPULATING HIERARCHICALLY LINKED DATA IN A GENEALOGY DATABASE USING A GRAPHICAL INTERFACE

CROSS-REFERENCED RELATED APPLICATIONS

This application claims the benefit of U.S. Provisional Application No. 60/938,260, filed May 16, 2007, which application is incorporated herein by this reference.

BACKGROUND OF THE INVENTION

Genealogy or the gathering of family information concerning ancestors and descendants has become an extremely popular pastime. Searching out ancestor relationships and histories has spawned many industries, one of which is a prolific software community. Software is used to store and view family histories, relationships, individual data such as birth and death dates and places, religious affiliations and rites, personal histories etc.

The genealogy software presently available uses the fundamental formats of a sheet called a "family group sheet" and a sheet called a "pedigree chart" for their basic display formats. Pedigree charts are used in many other areas including animal pedigrees and genetic pedigrees. Pedigrees are based on a common data structure known as "tree logic", where one piece of datum is connected to another piece of datum with graphical lines. These fundamental concepts and drawings representing pedigrees have been around for hundreds of years.

However, current genealogy software programs have essentially digitized the existing concepts of the "family group sheet" and the "pedigree chart" using pre-windows technology. The programs use DOS based concepts to manipulate and manage the genealogy data. Because these computer software programs use this limiting concept, it can be difficult to see relationships and lineages, manipulate data, add data into correct positions, see relationships and see different views of the data. Present software programs are also limited in their ability to identify and display unlinked data in the database. Once an individual is unlinked, the individual and the connected nodes "disappear" from the user's view and it is difficult for the user to see and understand what has been unlinked in the database.

Further, sharing of information between genealogy users is very common. One major problem in present genealogy programs is the data export selection process. If a user wants to give part of his genealogy to a relative, he must go through a tedious selection process. Even then, it is not clear what he has selected and transferred without another tedious audit of the new information. Likewise, when receiving information from someone else, importing that information into a user's database can cause horrendous problems and weeks of work to unravel the conflicts created by the import.

Accordingly, a need exists for a software program that gives the user a graphical view of his database which he can then easily manipulate using the graphical interface. Such a device is disclosed herein.

SUMMARY OF THE INVENTION

The term "user" in this discussion describes an operator of the computer system. The present embodiments relate to a method for displaying hierarchical linked genealogical data stored within a database. This method includes the step of displaying the entirety of the hierarchical linked genealogical data in an enhanced pedigree display (EPD) form on a computer screen. The enhanced pedigree display shows all data in the database, including information found in both "family group sheets" and "pedigree charts." The center of the computer screen being the root node individual, wherein the displayed pedigree chart becomes progressively smaller away from the root node individual (in both the vertical and horizontal directions). The method also includes the step of configuring the EPD to automatically adjust the display if the user selects a different root node individual. In some embodiments, the method includes the step of having a "mini-map" image being displayed, the mini-map image showing a representation of all of the hierarchical linked genealogical data, and the mini-map image indicating where the portion of the hierarchical linked genealogical data being displayed fits on the EPD. Further embodiments may have event data displayed on the EPD; the event data includes one or more of the following: data related to birth, marriage, religious events, death, and photographs. Multiple EPDs may be displayed at the same time on the same computer screen. Each of these multiple EPDs will have the entire database displayed (in the manner taught herein). A user can change the aspect ratio of the EPD using graphic sliders, the scale of the EPD (zoom in and out) or move the EPD horizontally and vertically to focus on a particular entry.

The present embodiments also provide a method for importing data from another computer source, "merging" information for two individuals into a single individual, or modifying data in the database. For example, the method may include the step of reviewing data to determine if individuals listed in the pedigree charts are duplicates. If duplicates exist, the user may be notified so that he or she may make the appropriate changes or merge the information for the duplicate individuals. Further, the user can modify the EPD, wherein the user can preview the changes to be implemented before the modification (or merge) is implemented.

In addition to the above-recited methods, the present embodiments relate to a computer-program product (such as a software program) for displaying hierarchical linked genealogical data stored within a database. The computer-program product comprising a computer readable medium having instructions thereon, the instructions comprising code for displaying the entirety of the hierarchical linked genealogical data in EPD form on a computer screen with the center of the screen being the root node individual, wherein the displayed pedigree chart becomes progressively smaller away from the root node individual. The product also includes code for configuring the EPD to automatically adjust the display if the user selects a different root node individual. The computer program product further comprises code for displaying a "mini-map" image, the mini-map image showing a representation of all of the hierarchical linked genealogical data, the mini-map image indicating where the portion of the hierarchical linked genealogical data being displayed fits on the EPD.

The first problem overcome by the invention is the display of unlinked data. Data residing in the database can be linked or unlinked. Groups of linked data ("trees") can exist independently in the database. Single unlinked datum (individuals) can also exist independently in the database. The first selection display in the invention overcomes the problem of seeing unlinked data in the database. A display of all the "pedigree trees" and unlinked individuals allows the user to select the appropriate pedigree tree for display.

Enhanced Pedigree Display (EPD) is the basis for the primary display in the invention. It becomes the primary input, change, delete and manipulation graphic of the invention. The EPD shows all tree nodes (individuals), all relationships (families) and all events and other data (marriages and births) in the entire database on one computer screen. Using zoom functions common in the industry, the user can zoom in to bring the detail into readable form. As in other software programs, the fonts change in size to allow more readable text.

As the user zooms in to see more detail, a small rectangle graphic representing the current view is superimposed over a small "mini-map" representing an entire linked tree. This shows the user where in the tree the present view resides. The user can move the pedigree graphic shown on the display from side to side and up and down to see adjacent portions of data.

The invention allows the user to not only see relationships but to graphically add, modify or delete from those relationships directly on the EPD. Likewise, data is graphically highlighted to show which individuals will be deleted with the delete feature. The user can also graphically select tree nodes, individuals and complete tree lines for extraction to transfer to another computer system or another database. Each individual and family can be selected or deselected for extraction and the effect of that selection is shown graphically on the EPD.

The invention allows the user to search for data in the database by the input of strings of characters for names and places. The invention will then display graphically the tree nodes which contain the data. Thus a user can see relationships and connections deep inside the EPD.

Additional features and advantages of the invention will be set forth in the descriptions that follow, including the claims. These and other features and associated advantages of the invention will become more fully apparent from the following description and appended claims, or may be learned by the practice of the invention as set forth hereafter. Some of the advantages of the invention are only apparent when learned in practice because of the many interrelationships between the features.

BRIEF DESCRIPTION OF THE SEVERAL VIEWS OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 25 illustrates the display in FIG. 1 in which part of the database is selected for extraction or deletion;

DETAILED DESCRIPTION OF THE INVENTION

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the present embodiments, as represented in the Figures, is not intended to limit the scope of the invention, as claimed, but is merely representative of presently preferred embodiments of the invention.

The graphic program preferably operates on a conventionally known computer system (not shown). The computer system includes an internal memory for storing computer program instructions which control how a processing unit within the computer accesses, transforms and outputs data. The internal memory includes both a volatile and a non-volatile portion. Those skilled in the art will recognize that the internal memory could be supplemented with other computer useable storage media, including a compact disk, a magnetic drive or a dynamic random access memory.

Fundamental to understanding the methods employed in the invention is an understanding of the standard human interfacing with the computer graphical interface. All such standard functions are easily understood by those familiar with the art. For example, when the expressions such as "mouse click" or "press the OK button" are used, it is understood that this is computer terminology for physically pressing the mouse button down on the mouse device, but pressing the OK button on the screen represents moving the pointing device so that the graphic cursor on the screen is over the graphic representing a button on the screen and then physically pressing the button on the physical mouse. Many other similar computer functions applying to this invention are not delineated here but are common and standard to those familiar with the art of the computing environment.

Figure 1:
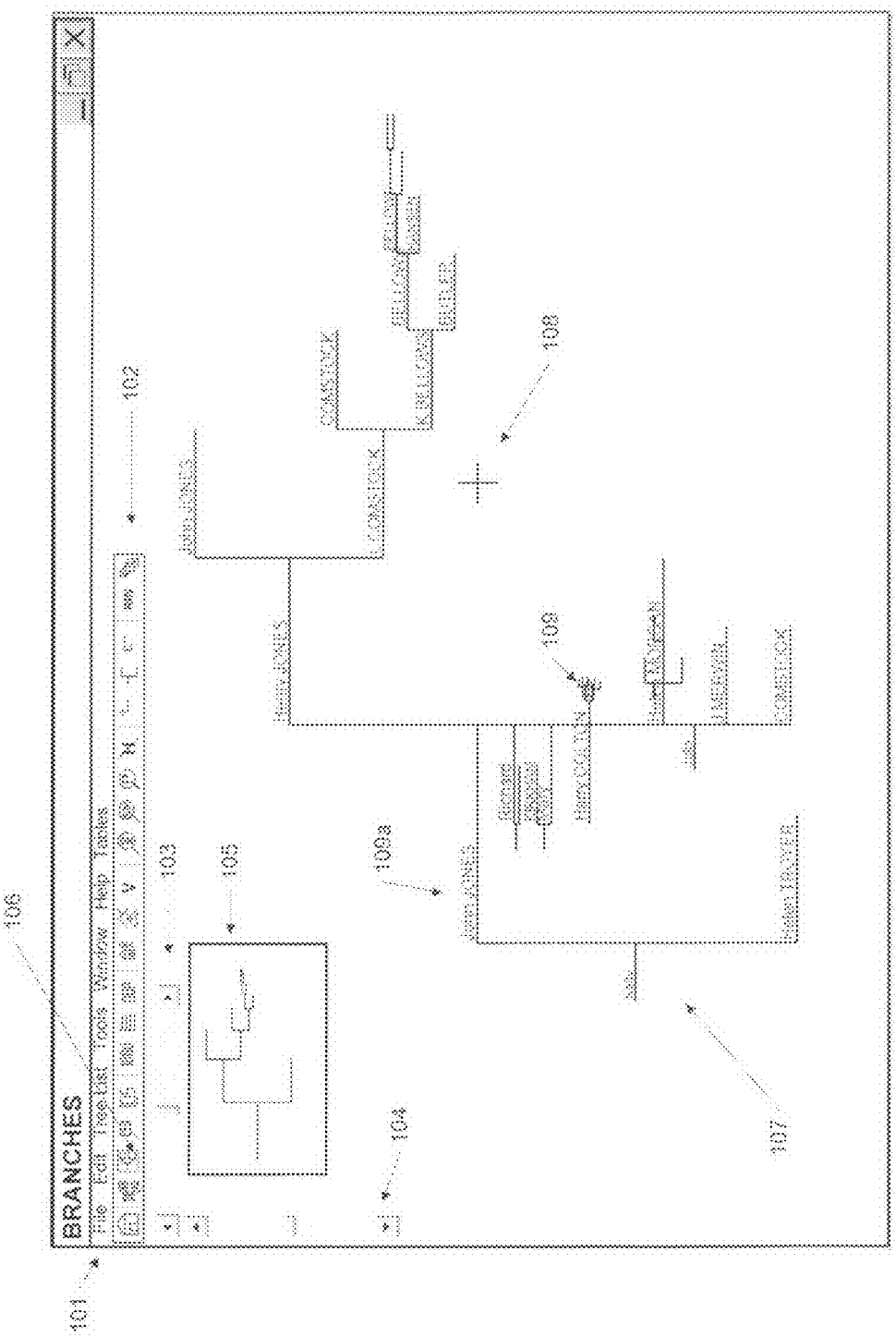
FIG. 1 illustrates the display and enhanced pedigree graphic rendered by the software including the mini-map and aspect ratio changing sliders.
Figure 14:
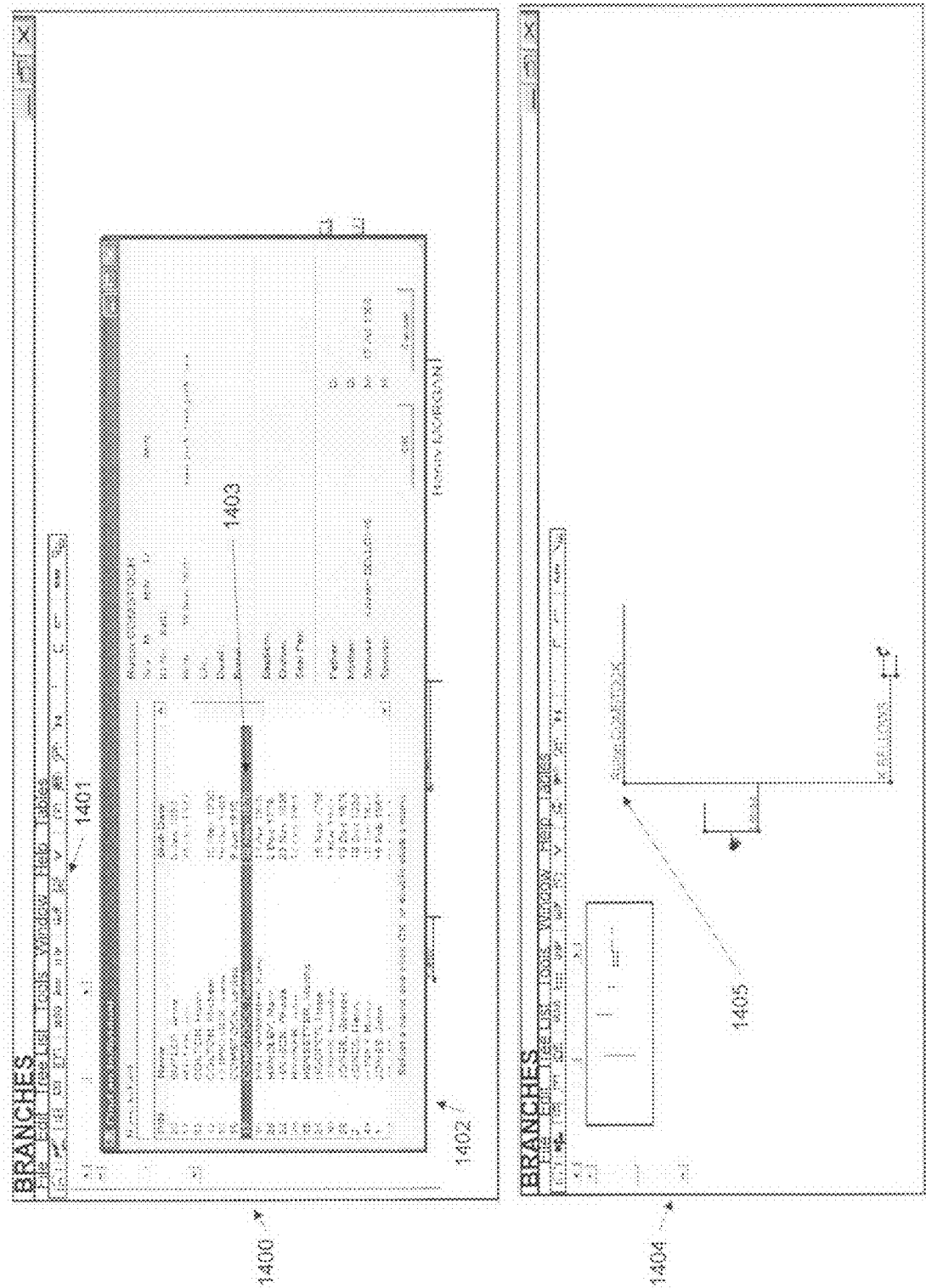
FIG. 14 illustrates the display in FIG. 1 in which the root node person is changed by selecting from a list.

FIG. 1 illustrates an enhanced pedigree display (EPD) 100 generated by the application program. The display 100 includes a toolbar 101 holding the list of major functions of the application some of which are standard to the windows operating environment. The display 100 contains an icon array 102 holding icons representing common functions to the invention. Underneath the icon row 102 is a graphic 103 representing a horizontal slider with a slider button common in the art. On the left side of the display 100 is a graphic 104 representing a vertical slider with a slider button common in the art. To the side of the graphic 104 is a graphic 105 ("mini-map") representing the entire linked EPD 107 that resides in the database. The database may be a list of entries of individuals in the person's genealogy or pedigree (as shown in FIG. 14). This EPD 107 is often referred to as a pedigree chart and represents the persons' ancestry. The EPD 107 shows "hierarchical linked genealogical data" meaning that is shows the family hierarchy-parent/child relationships, marriages, etc.

The mini-map 105 is activated by an icon 106 on the tool bar 102. The primary graphic 107 represents a view of the entire EPD being viewed. A graphic cross 108 on the form 100 represents the physical middle of the display. The graphic 100 contains graphics 109 that are typical in the graphic 100 that represent concentrations of data in the EPD. It should be noted that the person whose pedigree is being displayed is the "root node individual." In FIG. 1, this root node individual is person 109a. The EPD displayed for this individual becomes progressively smaller away from the root node individual 109a. Of course, as explained herein, the user may select a different person on the chart to be the root node individual, and if so selected, the EPD automatically adjusts the display if the user selects a different root node individual.

Figure 2:
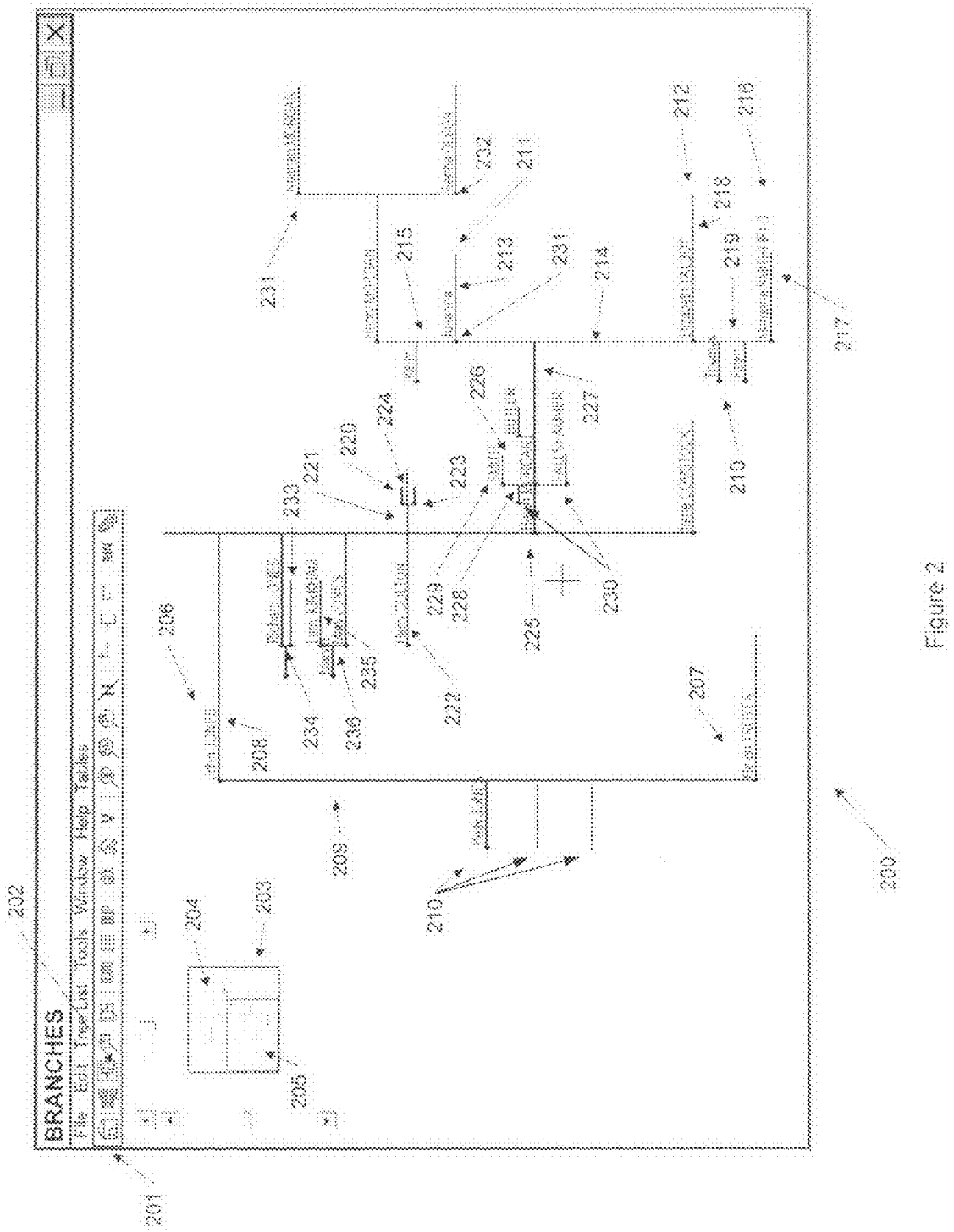
FIG. 2 illustrates the display in FIG. 1 with relationship graphics displayed.

FIG. 2 illustrates a view 200 produced when the user operates a standard computer wheel mouse either forward or backward which is standard in the art. The display "zooms" into or out of the graphic 100 representing the tree of linked data in the database to see more or less detail. This zooming feature is common to computing environments and to photographic enlarging and compression. The graphic "mini-map" 203 is activated by selecting an icon 202 from the icon tool bar 201. A graphic 205 representing the view 200 is superimposed on the whole tree graphic 204 to show where the current view 200 is in relationship to the whole tree 204.

Relationships between primary linked data such as husband 206 and wife 207 are represented by horizontal lines 208 and a vertical line 209 standard to the genealogy industry. The direct child is represented by a horizontal line 210 connected on its right to the vertical line 209 representing the marriage between husband and wife. This is also standard in the industry. Multiple children 210 in a marriage 209 are represented by additional horizontal lines 210 connected to the vertical 209 line. While this representation is not as common, it is found in the genealogy literature predating computers.

Additional relationships are represented by additional graphics (not heretofore known in the art) as follows:

A wife or multiple wives 211 above the main wife 212 are represented by short horizontal lines 213 connected by the left end of the short line 213 to the vertical marriage line 214. The space 215 between the wives represents a marriage.

A wife or multiple wives 216 after the main wife 212 are represented by short horizontal lines 217 below the main wife's horizontal line 218 connected to a marriage line 214 extended below the main wife 212. Each segment 219 of the extended line represents a marriage. Children of these marriages are represented by standard genealogy pedigree lines 210 as described above. Spouses of the male children are represented by a horizontal line 233 attached at the left end to a vertical line 234 ascending upward and attached to the male child. Spouses of the female children are represented by a horizontal line 235 attached at the left end to a vertical line 236 descending down and attaching to the female child.

Second and multiple parents 220 are represented by a right extension of the horizontal line 221 of the child 222 attached to the standard format of parents 223 in a reduced graphic format 224.

Second and multiple husbands of wives 225 are represented by a short horizontal line 226 attached to the spouse horizontal line 227 by a vertical line 228. Multiple spouses and children 230 of the husband 229 are represented in the graphic format for multiple spouses described above.

All links between two data are represented by a small circle 231 representing that the data are related. The context and location of where the circle lies determines the relationship of the datum. A circle 232 also identifies the focal point of an individual for purposes of zooming in for finer detail.

Figure 3:
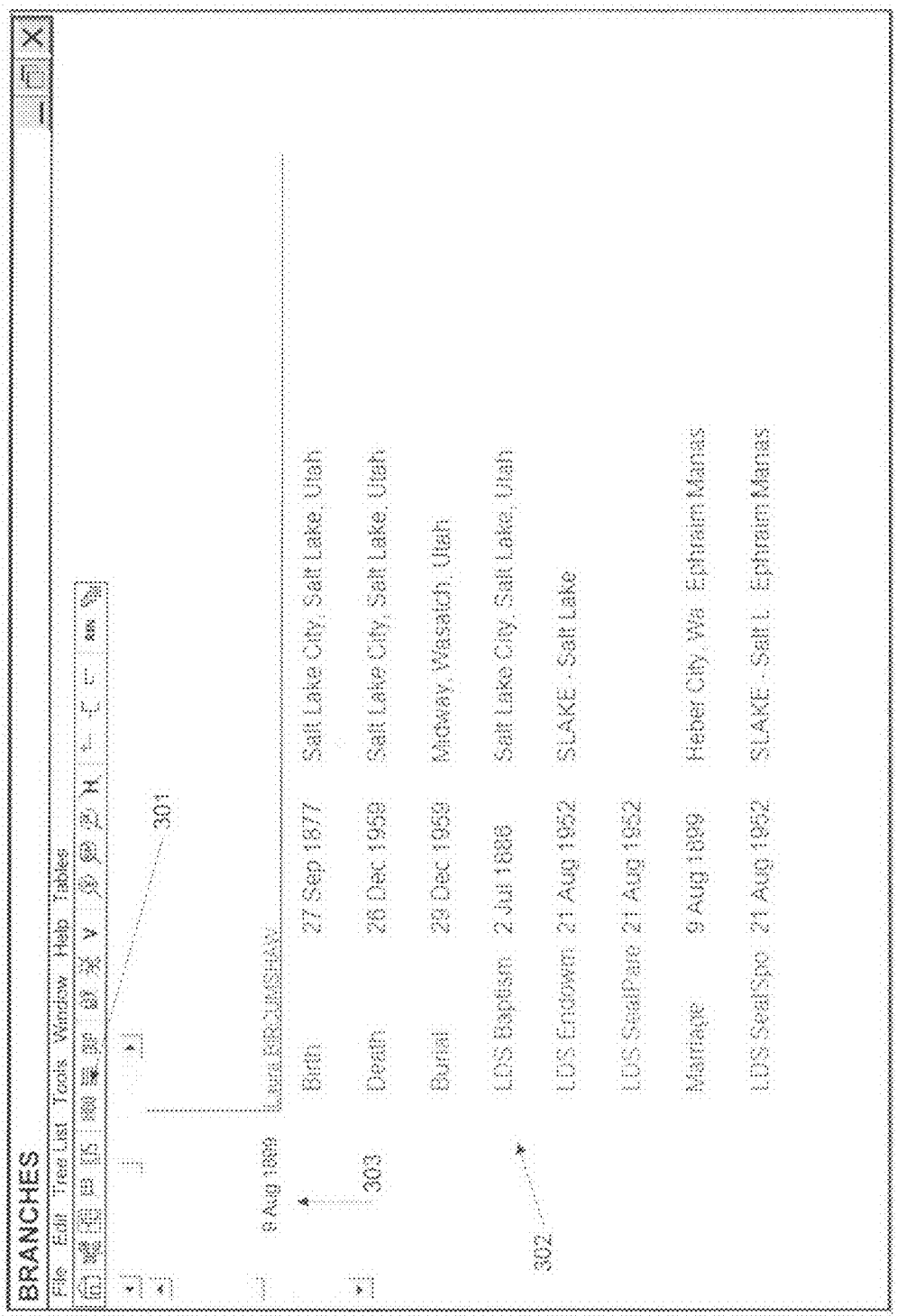
FIG. 3 illustrates the display in FIG. 1 in which events and notes are displayed.

FIG. 3 illustrates a display 300 showing individual 302 and marriage 303 data (events) which are brought into view by selecting the event 301 and operating the wheel on the mouse as part of a standard computing system.

Figure 4:
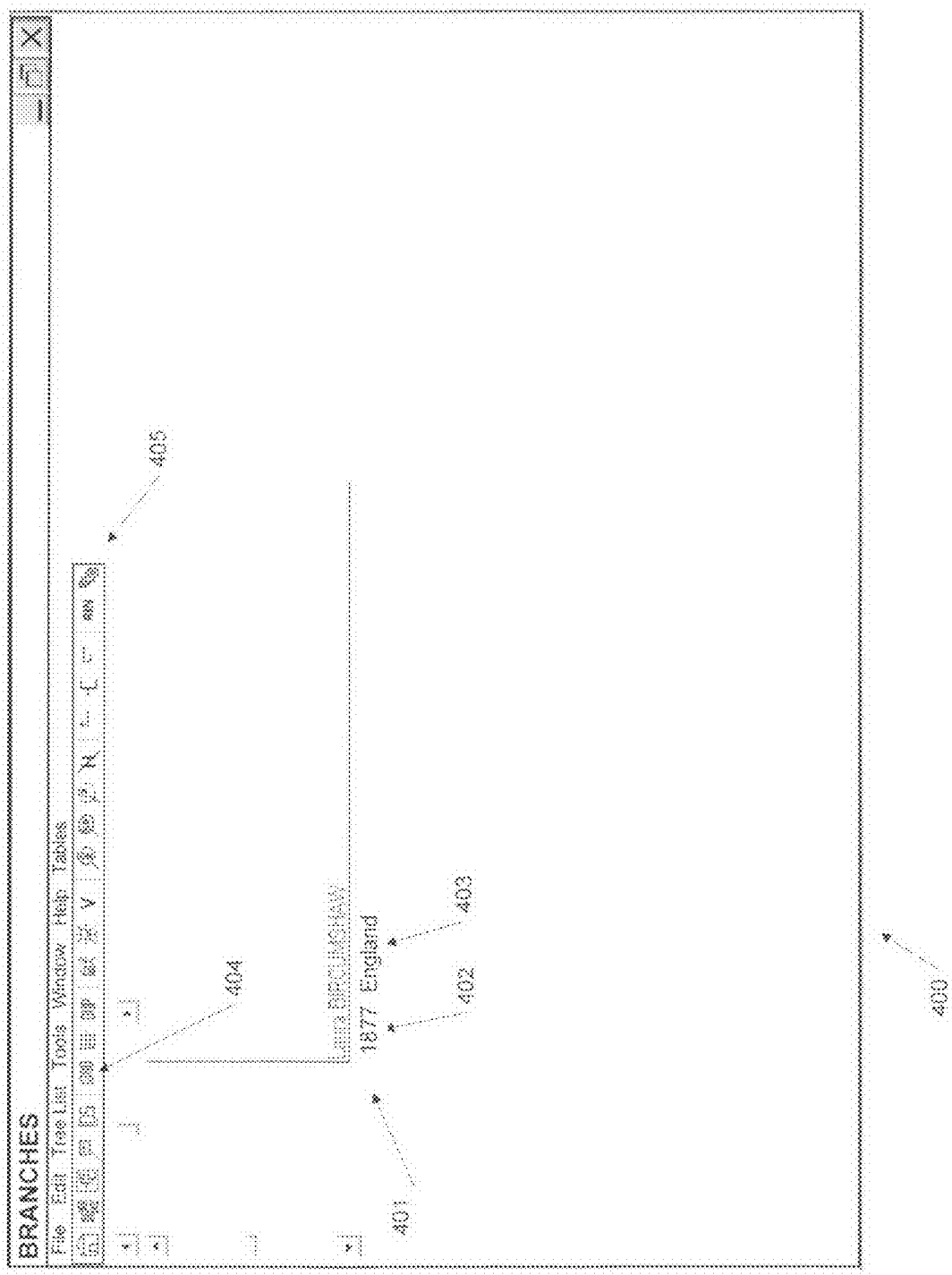
FIG. 4 illustrates the display in FIG. 1 in which year and country or state of birth are shown.

FIG. 4 illustrates a display 400 showing an abbreviated birth event 401 comprising a birth year 402 and a country or state of birth 403 activated by selecting with a computer pointing device the date/place icon 404 from the icon tool bar 405.

Figure 5:
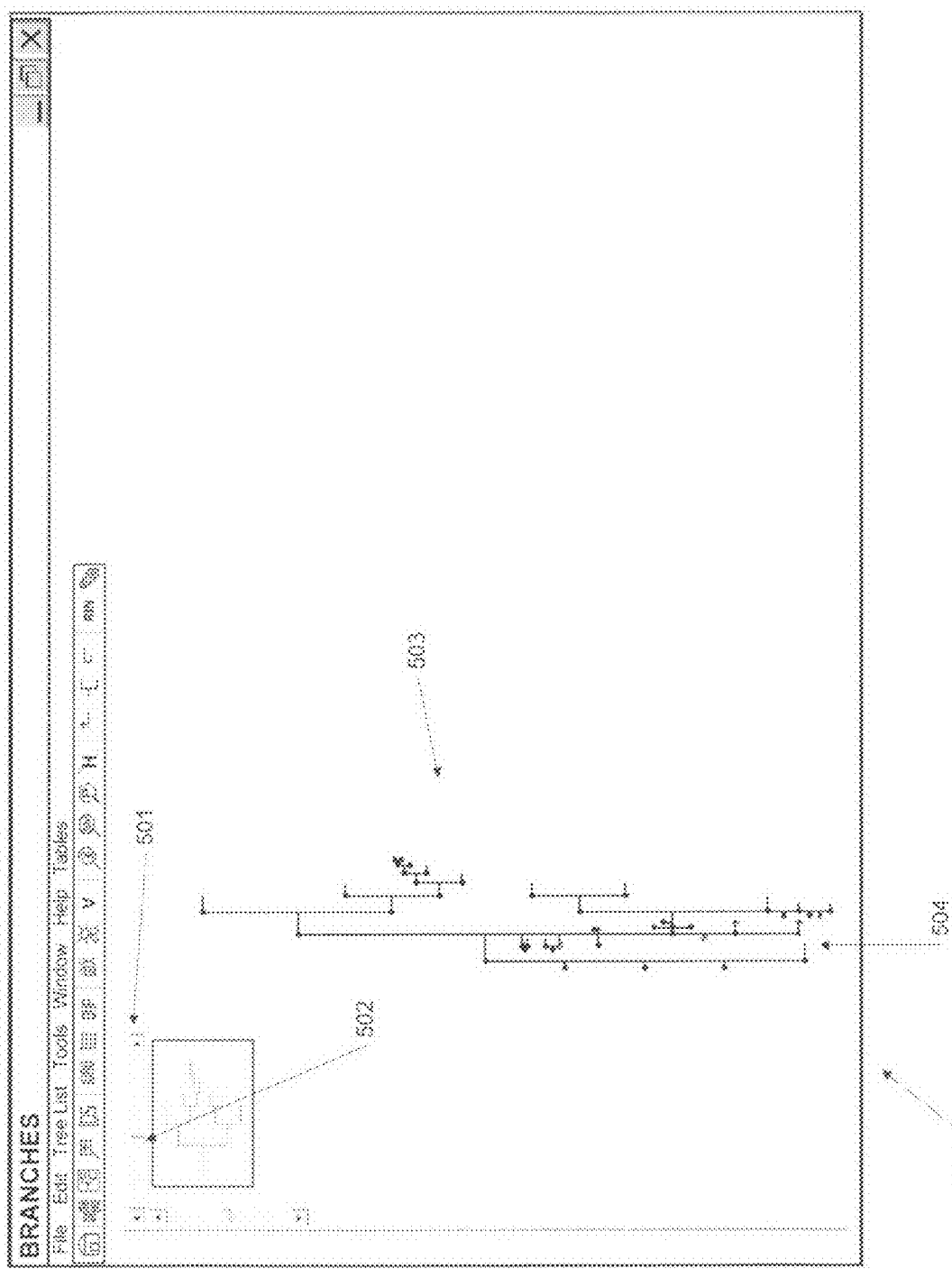
FIG. 5 illustrates the display in FIG. 1 in which the aspect ratio of the EPD has been changed horizontally.

FIG. 5 illustrates a display 500 showing the functionality of the variable horizontal aspect slider graphic 501. By sliding the graphic's slider 502 right or left, the horizontal aspect ratio of the EPD 503 can be changed. The graphic 504 illustrates how the EPD can be compressed using the graphic slider 501.

Figure 6:
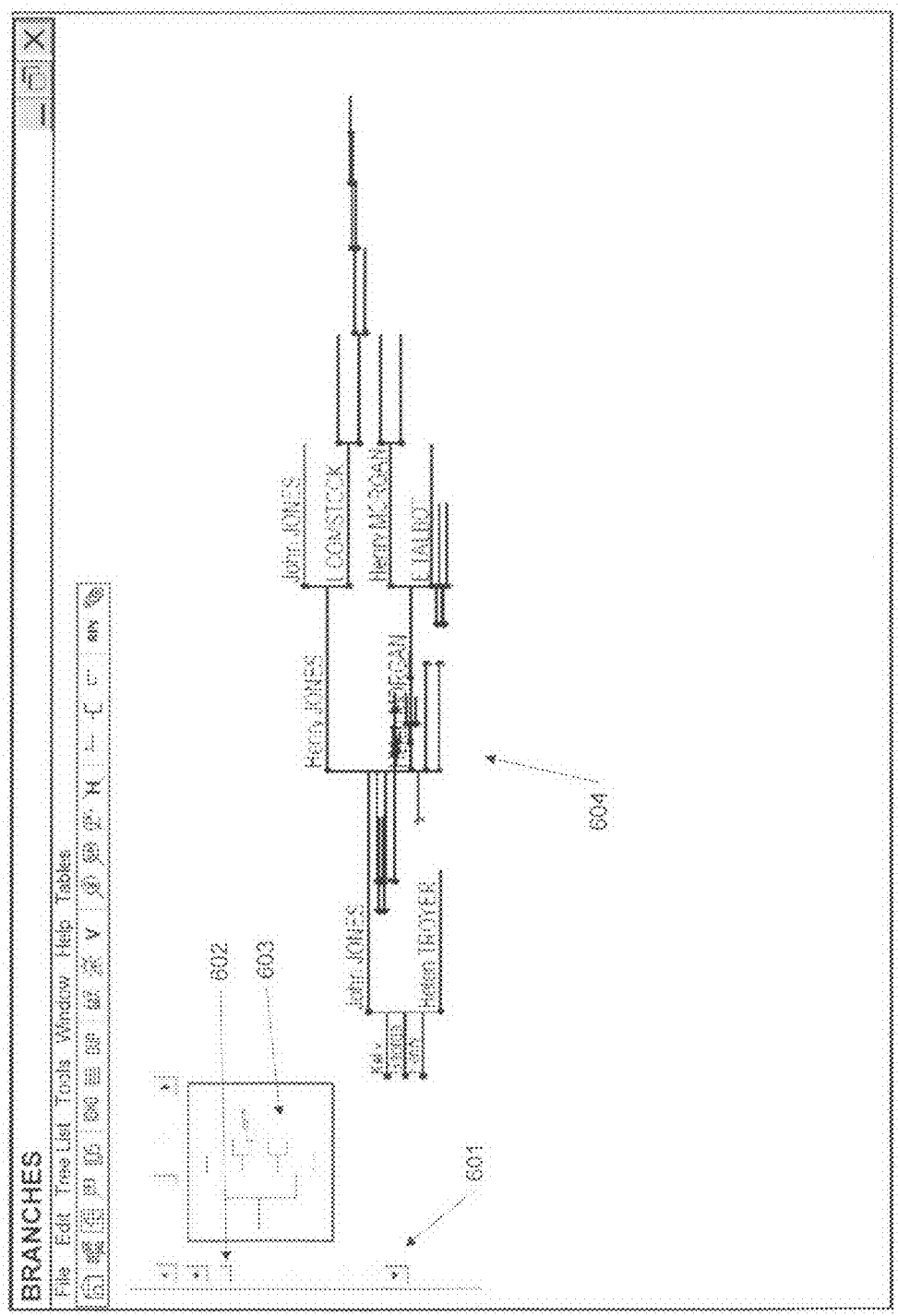
FIG. 6 illustrates the display in FIG. 1 in which the aspect ratio of the EPD has been changed vertically.

FIG. 6 illustrates a display 600 showing the functionality of the variable vertical aspect slider graphic 601. By sliding the graphic's slider 602 up or down, the vertical aspect ratio of the EPD 603 can be changed. The graphic 604 illustrates how the EPD can be compressed vertically using the slider graphic 601.

Figure 7:
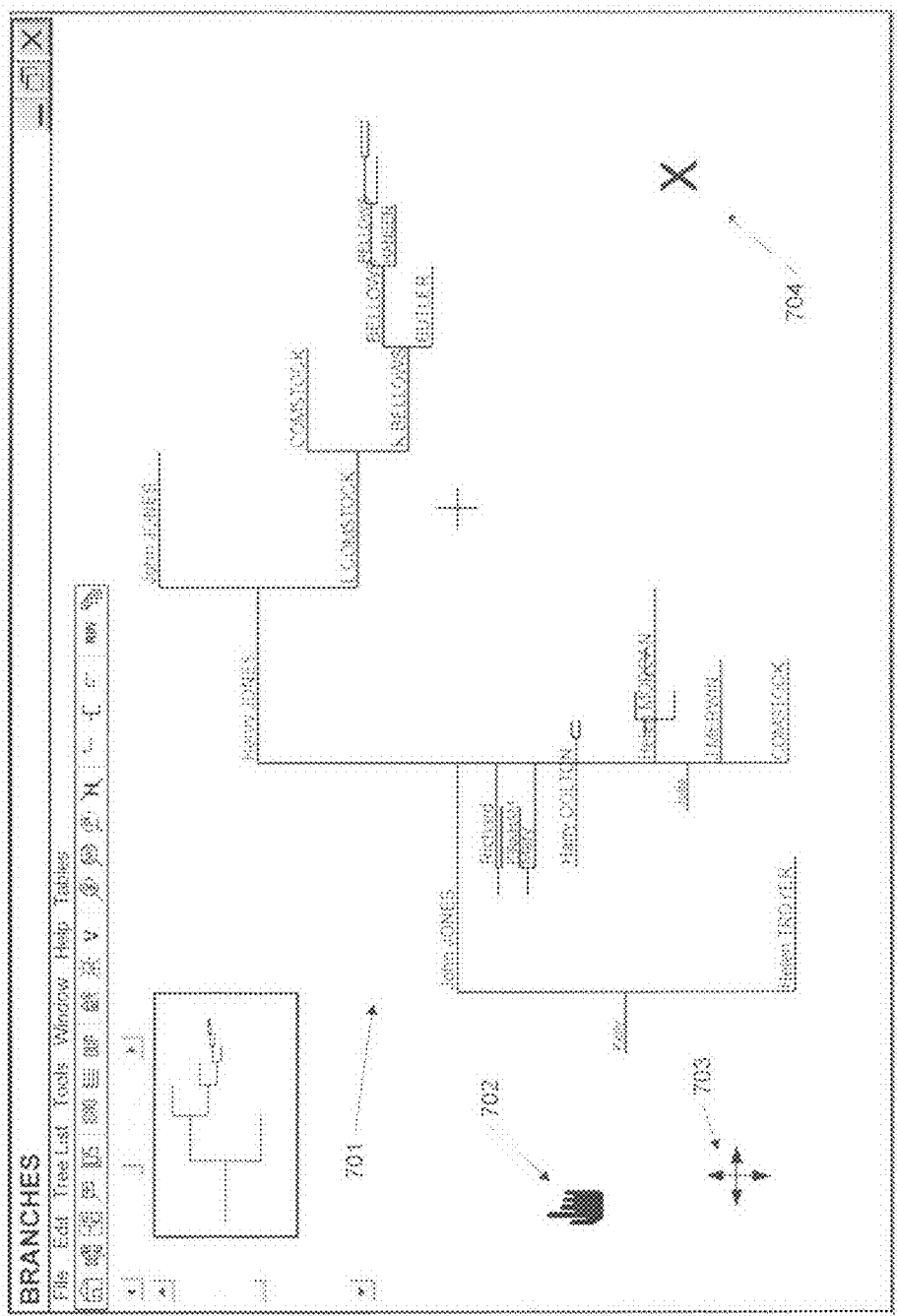
FIG. 7 illustrates the display in FIG. 1 in which the EPD is to be moved using the mouse pointer device.
Figure 8:
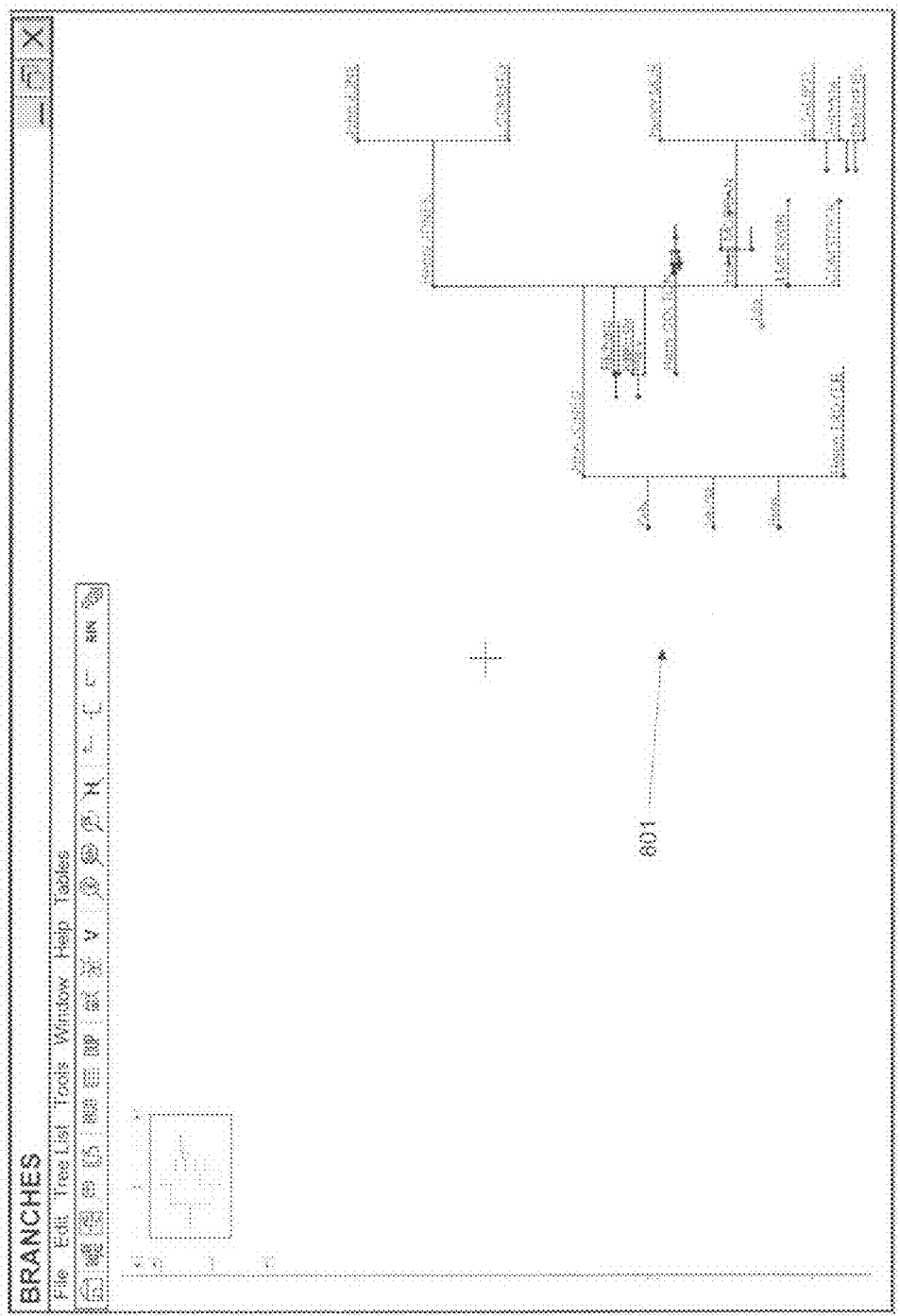
FIG. 8 illustrates the display in FIG. 1 in which the EPD has been moved.

FIG. 7 illustrates a display 700 with a zoomed out view of a graphic 701 contained in the database. The graphic 701 can be moved to any place on the display 700 by moving the standard hand icon 702 over the graphic, depressing the left mouse button (not shown), but standard to the art), which produces a multi-arrow graphic 703 (standard in computer software), holding the button down, then moving the graphic using a pointing device to a desired place 704 then releasing the mouse button, the graphic will move to the new desired location 704 as illustrated in FIG. 8 display 800 graphic 801.

Thus, FIGS. 6 and 7 show that the scale of the pedigree chart may be adjusted to focus on a particular entry, or to see the entirety of the database, etc.

Figure 9:
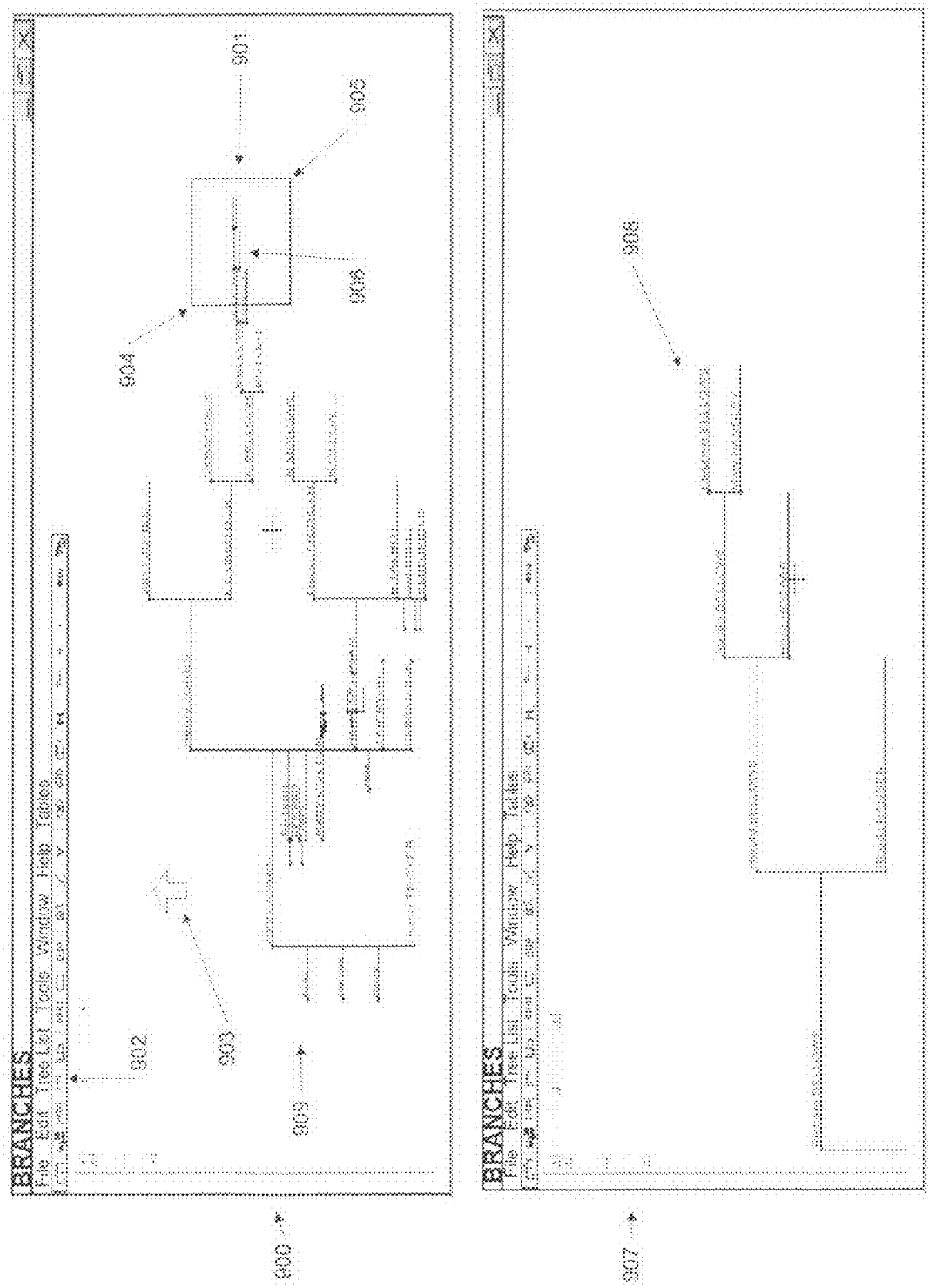
FIG. 9 illustrates the display in FIG. 1 in which the rectangle zoom feature is used.

FIG. 9 shows two displays 900 and 907. These displays illustrate the use of the rectangle zoom feature. This feature allows the user to graphically select a section 901 of the EPD 909 to view at a larger resolution. This feature is activated by selecting the rectangle zoom icon 902 which then changes the standard cursor icon to a pointer icon 903. The icon 903 is placed at the upper left hand corner 904 of the desired section 901, the left mouse button (not shown) is depressed and held down, the cursor 903 then is moved to the lower right hand corner 905 of the desired section 901 and is then released. The section 901 is then expanded to fill the display 907 so that the graphic 906 inside the section 901 is expanded to graphic 908.

Figure 10:
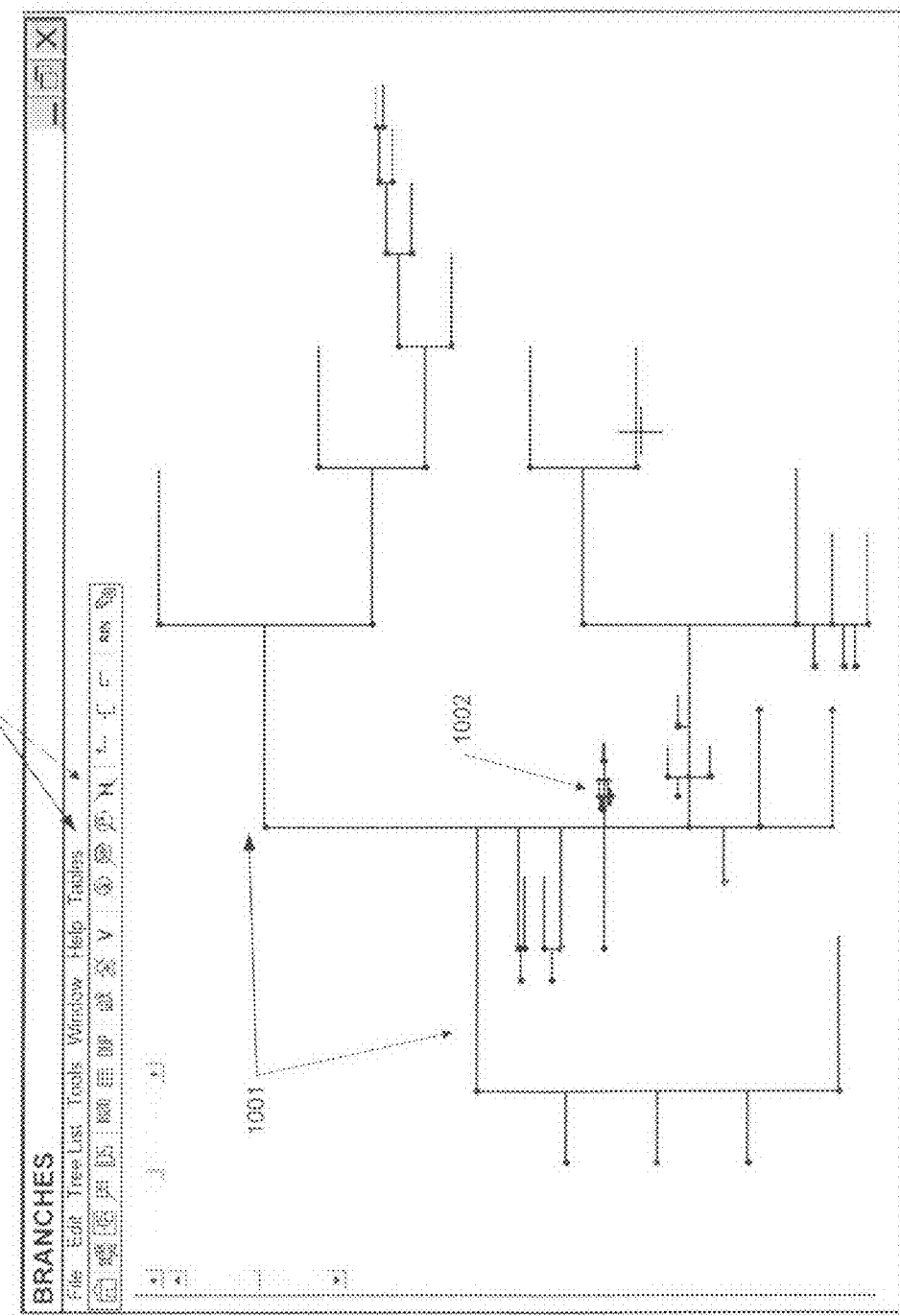
FIG. 10 illustrates the display in FIG. 1 in which only the graphic representing the EPD is shown.

FIG. 10 illustrates a display 1000 showing the structure of an entire tree inside the database but displayed without names 1001. It allows the user to see the structures and concentrations of data 1002 in the data base. This feature is activated using the drop down menus (standard in the industry) from the menu bar 1003 and could also be activated using an icon on the icon tool bar.

Figure 11:
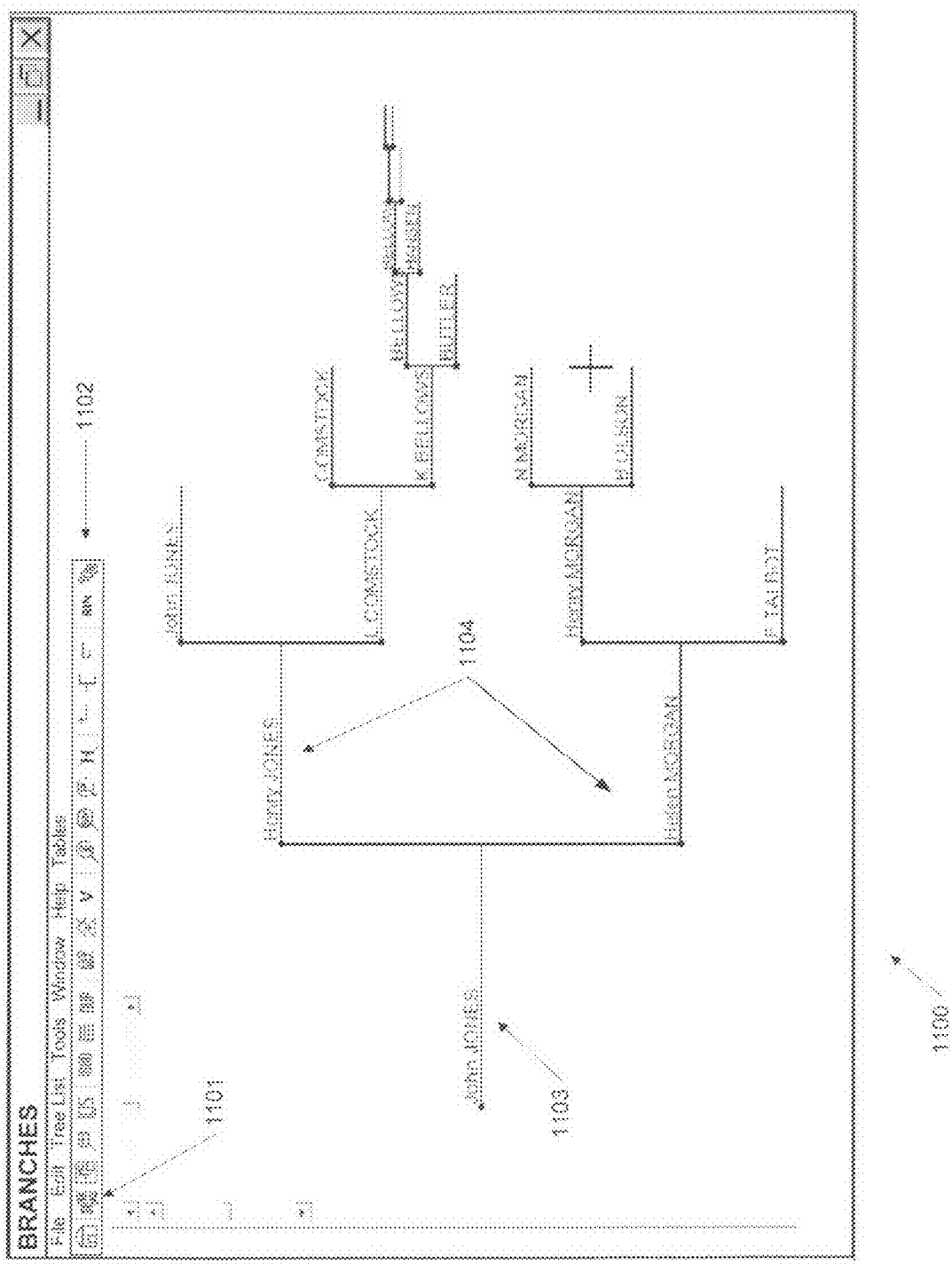
FIG. 11 illustrates the display in FIG. 1 in which only the main line pedigree is shown.

FIG. 11 illustrates a display 1100 showing only the main or primary links in the tree. This feature is activated by selecting the icon 1101 on the icon tool bar 1102. This shows only ancestors of the primary root person 1103 and includes no descendants of the ancestors excepting the primary lines 1104.

Figure 12:
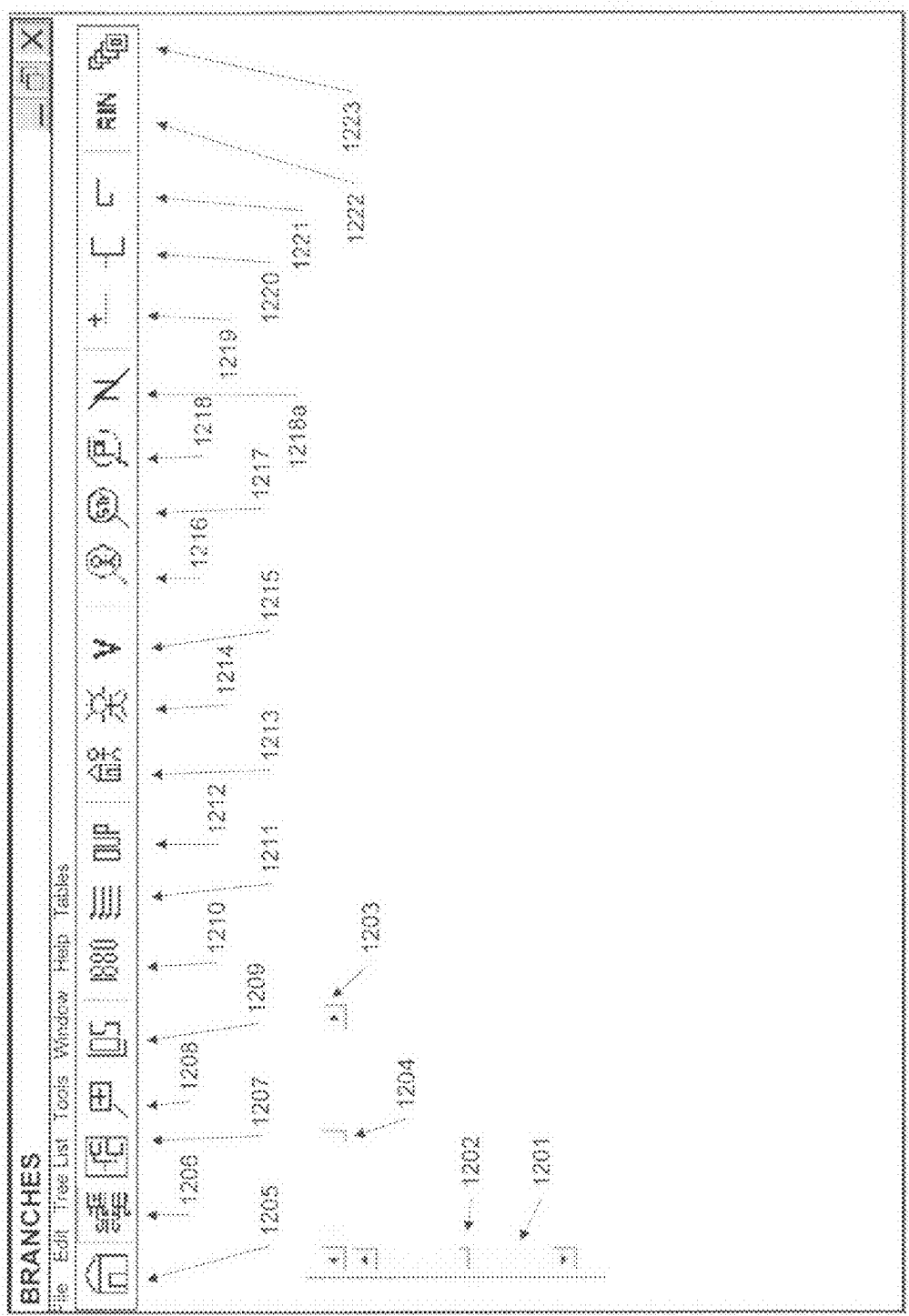
FIG. 12 illustrates the display in FIG. 1 in which the various feature icons on the icon tool bar are shown.
Figure 13:
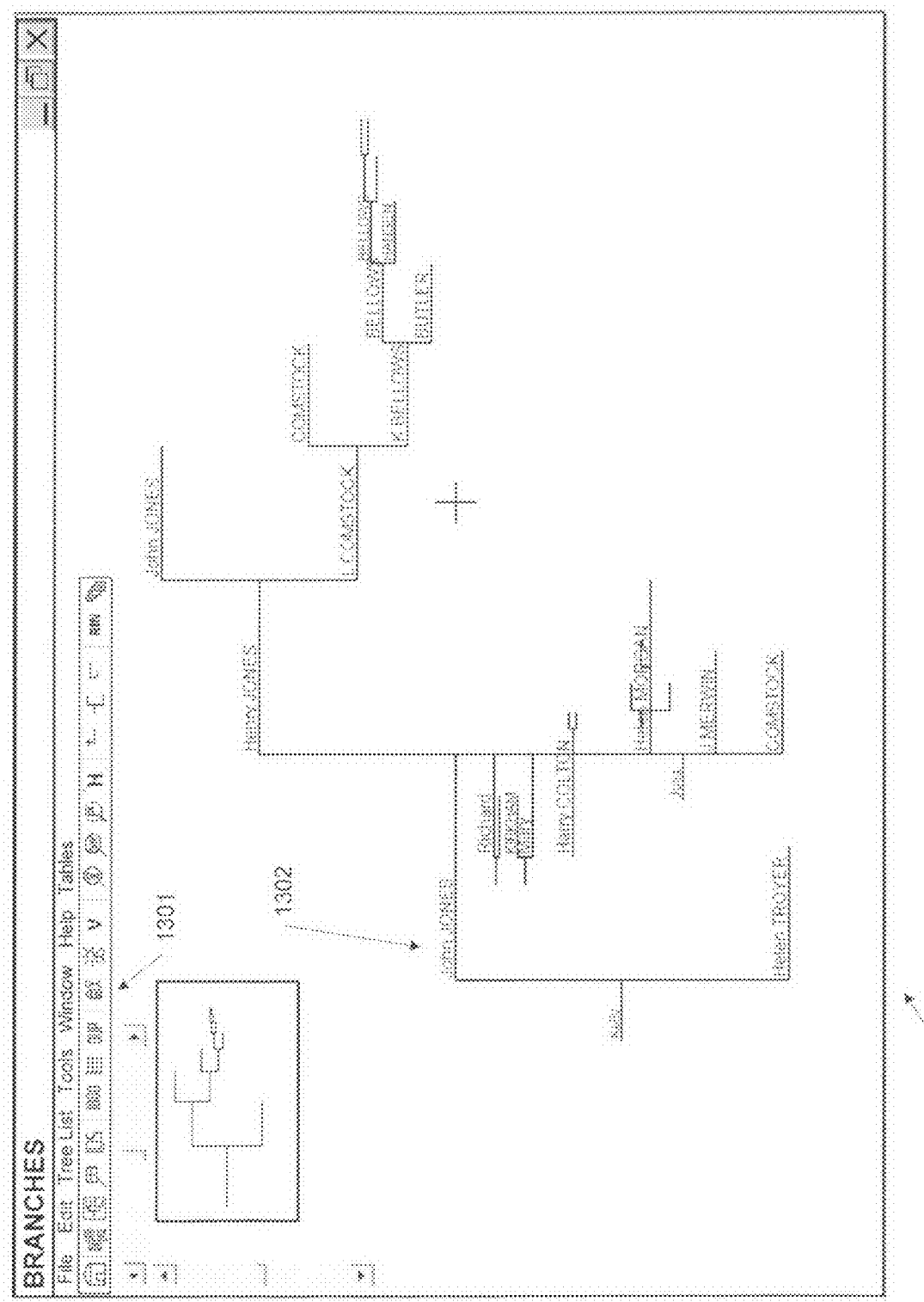
FIG. 13 illustrates the display in FIG. 1 in which the EPD is returned to the home root person.

FIG. 12 illustrates a partial display 1200 identifying the graphical icons used to selection various functions in the invention. (Other graphical icons may be added to further enhance the invention.) The icons represent the following functions:

1201 vertical slider graphic
1202 vertical slider selector
1203 horizontal slider graphic
1204 horizontal slider selector
1205 home position selection
1206 detail on or off
1207 display/hide the mini map
1208 rectangle zoom function selector
1209 optional view of LDS ordinance (or other religious information) events on/off
1210 birth year and country or state on/off
1211 events view on/off
1212 duplicate individuals connecting lines on/off
1213 return to primary home person selector
1214 new root person selector
1215 create a new view point selector
1216 find a person(s) using a name list
1217 find a person(s) using a partial name
1218 find a data linked to a place(s) using a partial place name
1218*a* show pedigree without names
1219 add an individual selector
1220 add a family selector
1221 add a spouse selector
1222 display/hide RIN numbers
1223 show tree lists of database FIG. 13 illustrates a display 1300 which shows the function of returning to the primary root person. The primary root person icon 1301 is selected and the EPD is redrawn to show the primary root person 1302 in the root node position.

FIG. 14 illustrates two displays 1400 and 1404 showing how to change the root person 1405 by selecting from a list of names 1402. The feature is activated by selecting the change root person icon 1401 on display 1400 which brings up a list of individuals 1402 in the database. An individual is selected 1403 and then a new display 1404 is drawn showing the reorganization of the data in the EPD with the new root person 1405 in the root node position.

Figure 15:
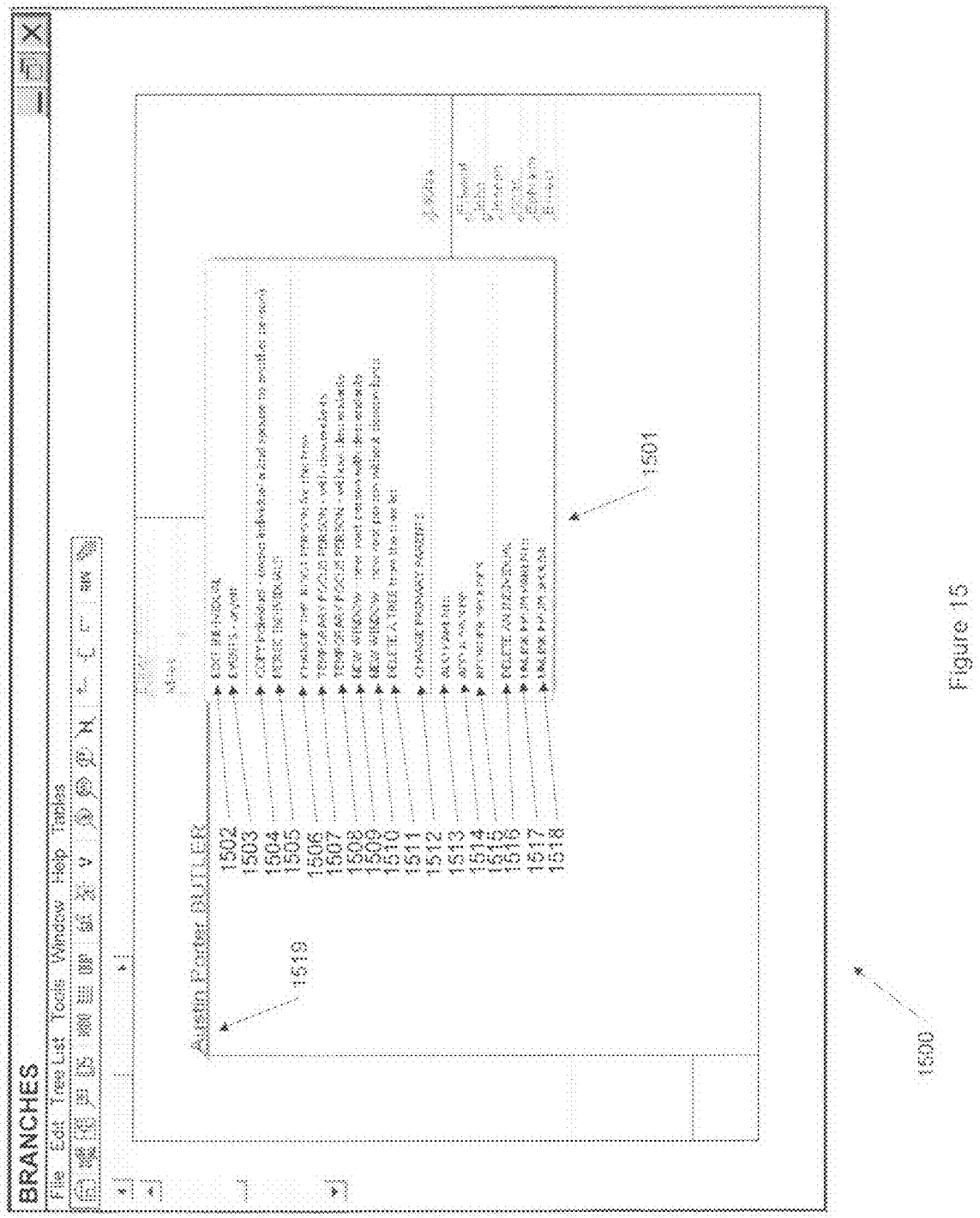
FIG. 15 illustrates the display in FIG. 1 in which various options are shown available to an individual.

Because of the graphic nature of the invention, many functions are selected based on movement of the cursor over key data graphics representations. As the user moves the cursor over a horizontal line for example, the line graphically changes color and is thickened. F*ig*.15 illustrates a display 1500 where in a horizontal line 1519 has been highlighted. While the line is highlighted, the user can depress the right button of the pointing device (not shown) and a menu appears 1501 showing what functions are available for manipulating the selected individual 1519. FIG. 15 illustrates a display 1500 with the various individual manipulation options. A popup menu (standard in the industry) 1501 is activated by a right mouse button click (standard in the industry) (not shown), showing the various options available for an individual.

A list of the functions in menu 1501 are given:
1502 Edit an individual's data associated or linked in the database
1503 Turn individual and marriage events on or off
1504 Copy an individual from one location to a new location
1505 Merge two individuals and change all links in the database
1506 Use the selected individual as the new root person in this tree
1507 Use the selected individual as a temporary root person in this tree and show the new tree with descendants in this window
1508 Use the selected individual as a temporary root person in this tree and show the new tree without descendants in this window
1509 Use the selected individual as a temporary root person in this tree and show the new tree with descendants in a separate window
1510 Use the selected individual as a temporary root person in this tree and show the new tree without descendants in separate window
1511 Delete a tree from the master tree list of this database
1512 Switch or change primary parents of an individual
1513 Add first or additional parents to this individual
1514 Add second or multiple spouses to this individual
1515 Reorder the spouses for this individual
1516 Delete the selected individual
1517 Unlink the selected individual from the individual's parents
1518 Unlink the selected individual from the individual's spouse(s)

Figure 16:
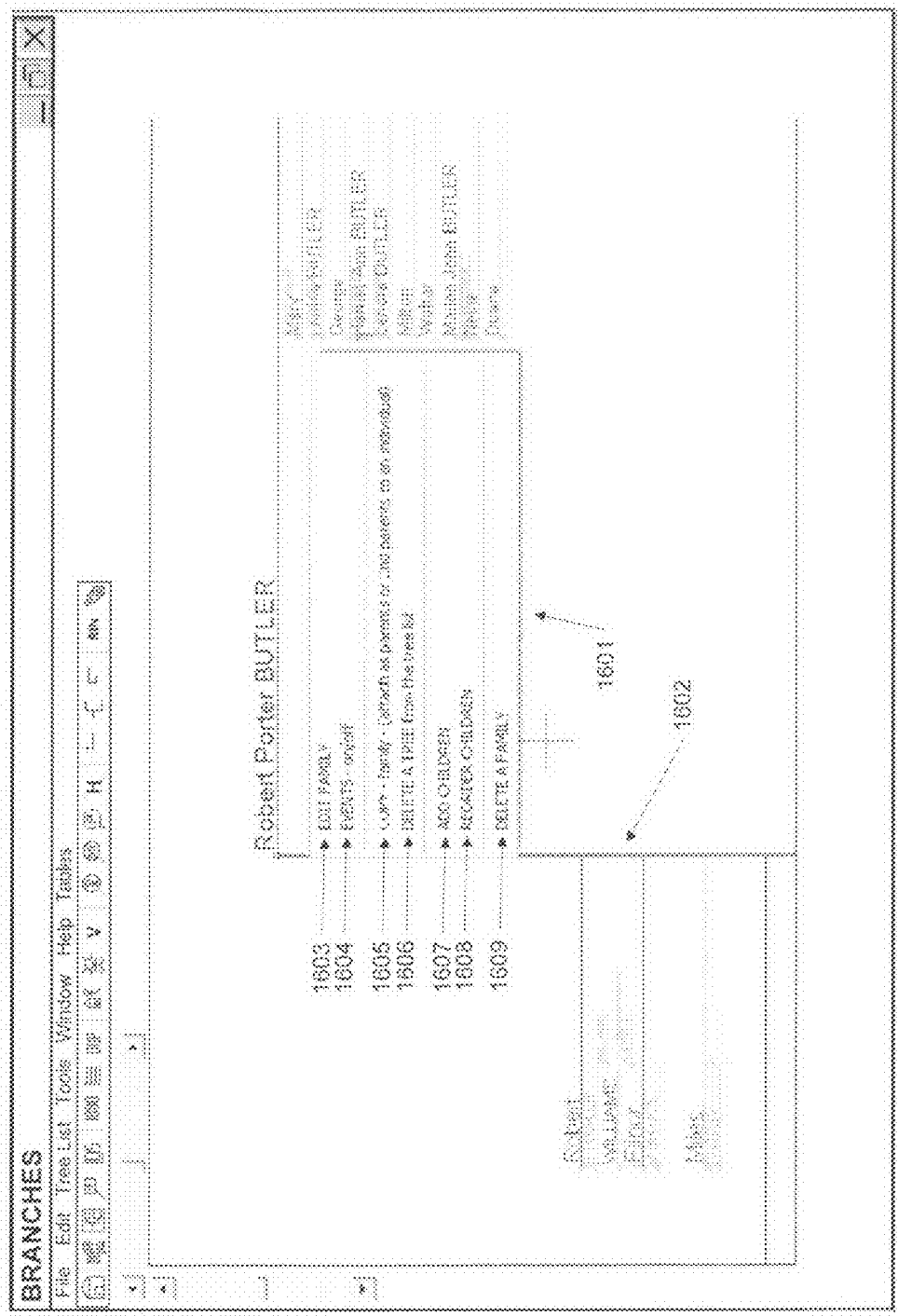
FIG. 16 illustrates the display in FIG. 1 in which various options are shown available to a family.

FIG. 16 illustrates a display 1600 where a vertical line 1602 has been highlighted. While the line is highlighted, the user can depress the right button of the pointing device (not shown) and a menu appears 1601 showing what functions are available for manipulating the selected vertical line (marriage) 1602. FIG. 16 illustrates a display 1600 with the various marriage manipulation options. A popup menu (standard in the industry) 1601 is activated by a right mouse button click (standard in the industry) (not shown), showing the various options available for an individual.

Figure 17:
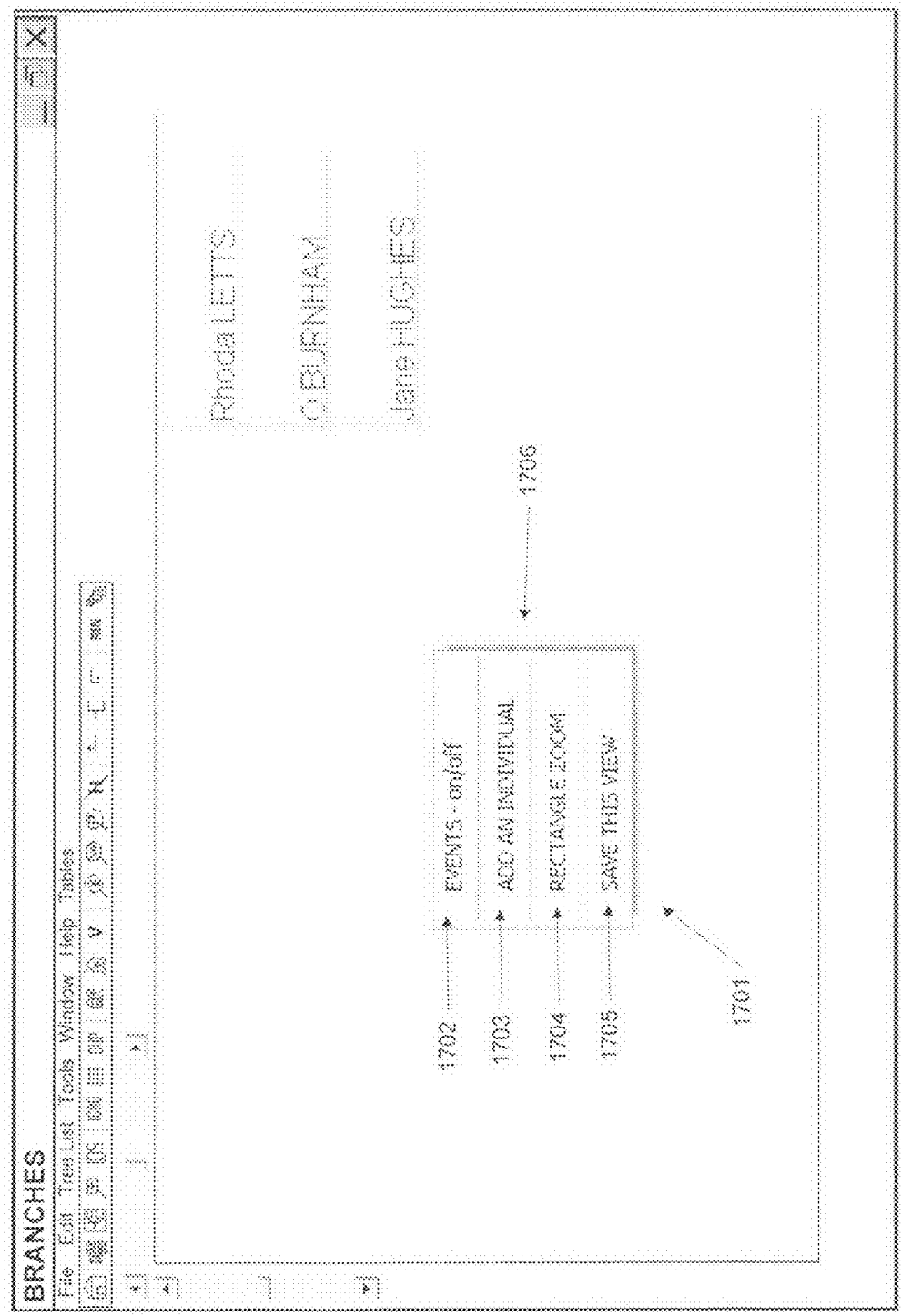
FIG. 17 illustrates the display in FIG. 1 in which various options are shown for global use.

A list of the functions in menu 1601 are given:
1603 Edit the family information of the family selected
1604 Turn individual and marriage events on/off
1605 Copy family from one location to a new location
1606 Delete a tree from the master tree list of this database
1607 Add children to the selected family
1608 Reorder children in the selected family
1609 Delete the selected family FIG. 17 illustrates a display 1700 where the cursor (not shown) is not over a vertical or horizontal line but is over clear space. A popup menu (standard in the industry) 1701 is activated by a right mouse button click (standard in the industry) (not shown), showing the various global options 1706 available.

These functions 1706 are:
1702 Turn individual and marriage events on/off
1703 Add an unlinked individual to the database
1704 Activate the rectangle zoom feature
1705 Save the present screen as a named view of the database.

Figure 18:
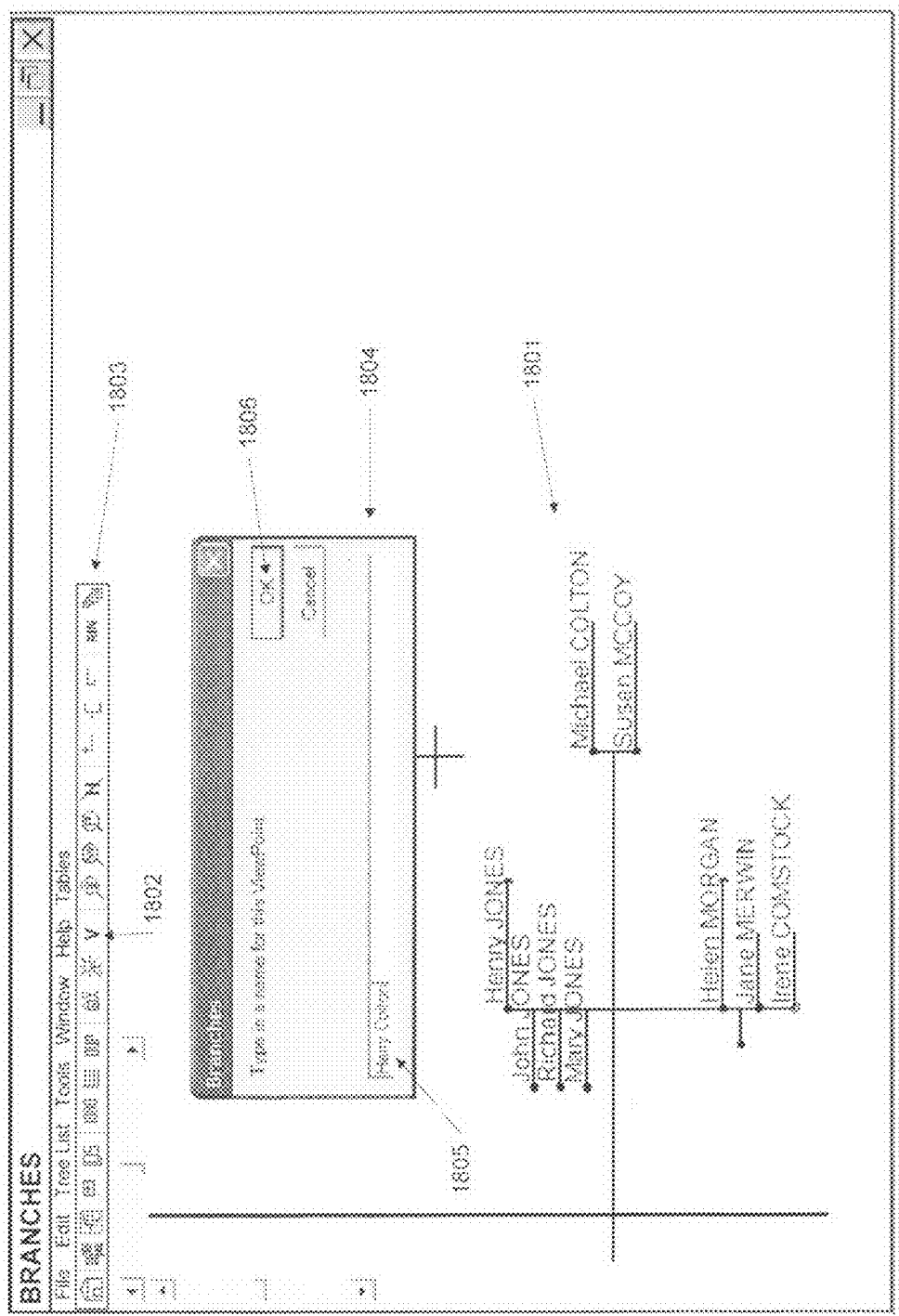
FIG. 18 illustrates the display in FIG. 1 in which the method of selecting views and saving them for future reference is shown.

FIG. 18 illustrates a display 1800 showing the "save a view" function. This allows the user to zoom into or out of a portion of the display and then save that view for future reference. This method comprises manipulating the EPD using the tools described above to create a view of the tree 1801. Then the user selects the "create a view" icon 1802 from the icon tool bar 1803 or selects the view option from the global popup menu 1706. A dialog box 1804 is displayed and the user types in a name 1805 for the view then presses the OK button 1806 to save the view. The view 1801 can be selected from another menu (discussed later) listing all trees and view in the database.

Figure 19:
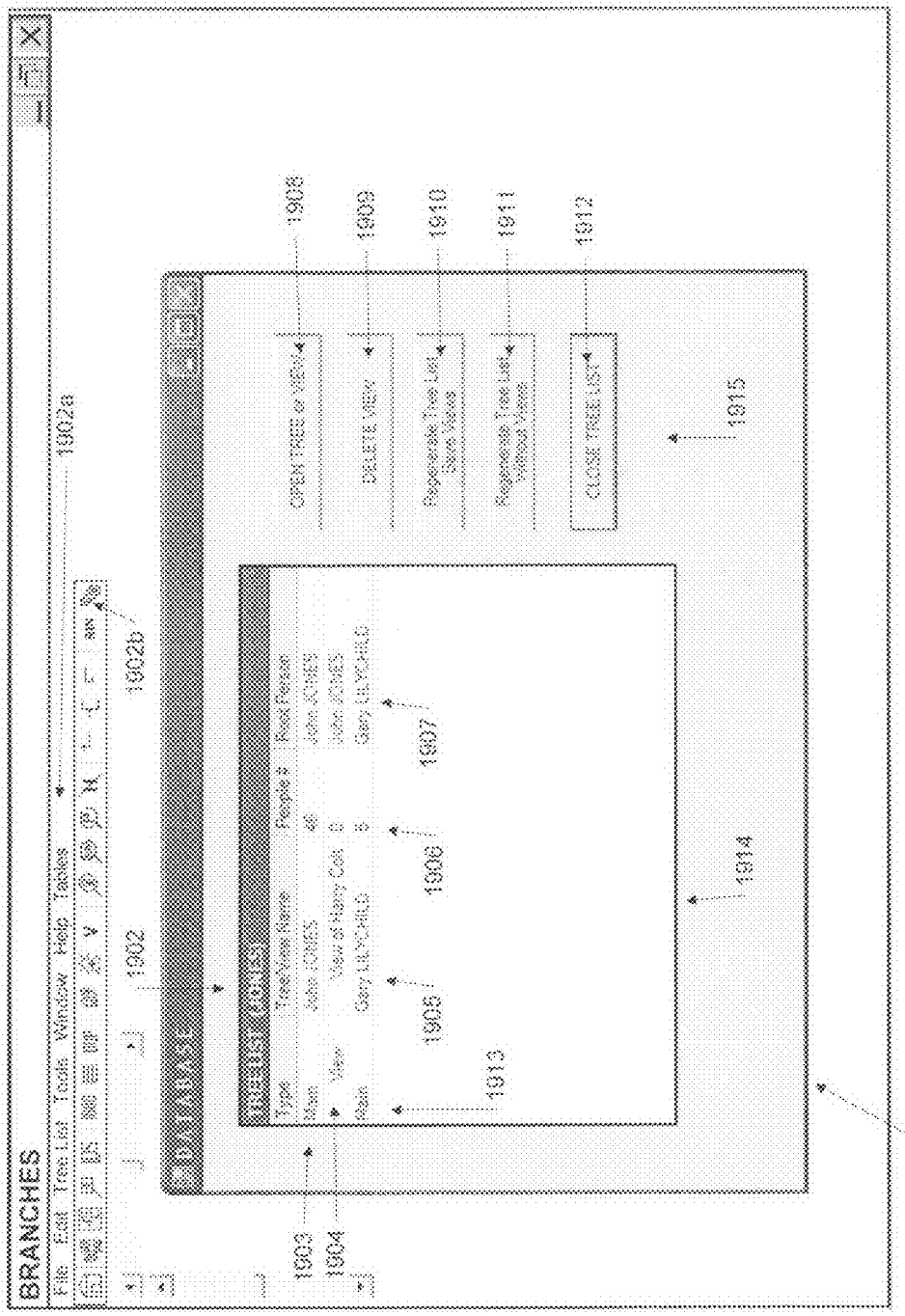
FIG. 19 illustrates the display which shows the form for selecting, deleting, and regenerating the unlinked trees and views in the database.

FIG. 19 illustrates a display 1900 showing the method and operation of the "tree list manager" portion of the invention. Data in the database can be linked or unlinked. Linked data comprises a "tree". An unlinked datum represents an individual. The tree list manager manipulates all linked and unlinked data in the database. These functions include displaying, identifying, opening, deleting, and regenerating unlinked data in the data base.

A user activates the tree list manager form 1901 in display 1900 on FIG. 19 by selecting from the main menu 1902a or by selecting an icon 1902b. The form 1901 contains information about the data in the database. The name of the database 1902 is shown at the top of the form 1901. A "tree" in the database is either a linked group of individuals or single unlinked individuals. The trees in the database are listed in two types, the main trees 1903 and the views associated with the main trees 1904. The form 1901 lists names 1905 of the trees, the number of people 1906 in the main trees and the names 1907 of primary root node persons for each main tree or view. The user can manipulate the trees 1913 in the tree list 1914 using the graphic buttons 1915 on the right side of the tree list 1914. A tree or view can be selected for display using the open button 1908. A tree or view can be deleted by selecting the delete button 1909. A method for reorganizing and relinking the database can be activated by selecting the regenerate button 1910. This button 1910 saves the views 1904 associated with the main trees 1903. A similar button 1911 regenerates and reorganizes the data links in the database without saving the associated views 1904. A close button 1912 allows closing the tree list manager form 1901.

Figure 20:
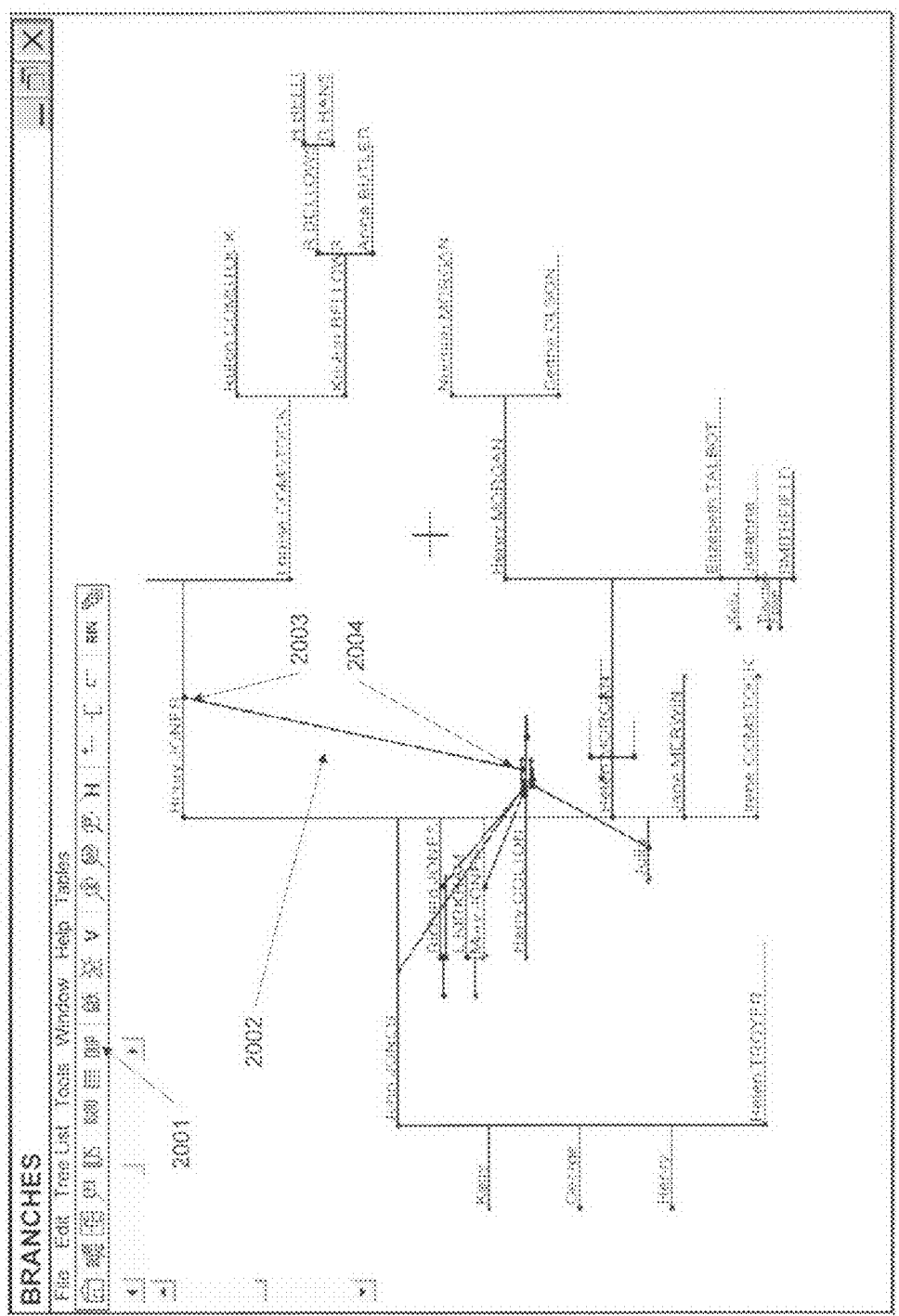
FIG. 20 illustrates the display in FIG. 1 in which duplicate records are shown.

FIG. 20 illustrates a display 2000 showing the method of displaying links 2002 between identical data. The selection of the duplicate icon 2001 activates the graphic drawing of the duplicate lines 2002. The duplicate lines 2002 have small colored end points 2003 and 2004 which identify whether the individual is the primary individual 2003 or a secondary individual 2004. The application program uses strenuous logic to determine which individual is the primary individual who is the reference point for continuous links or the secondary individual which limits further links and processing to eliminate eternal looped or non-ending processing. Those skilled in the art will appreciate how to construct an algorithm that will determine if data entries are duplicated. In other words, the algorithm will review the data to determine if there is likelihood that two entries have been inadvertently duplicated.

Figure 21:
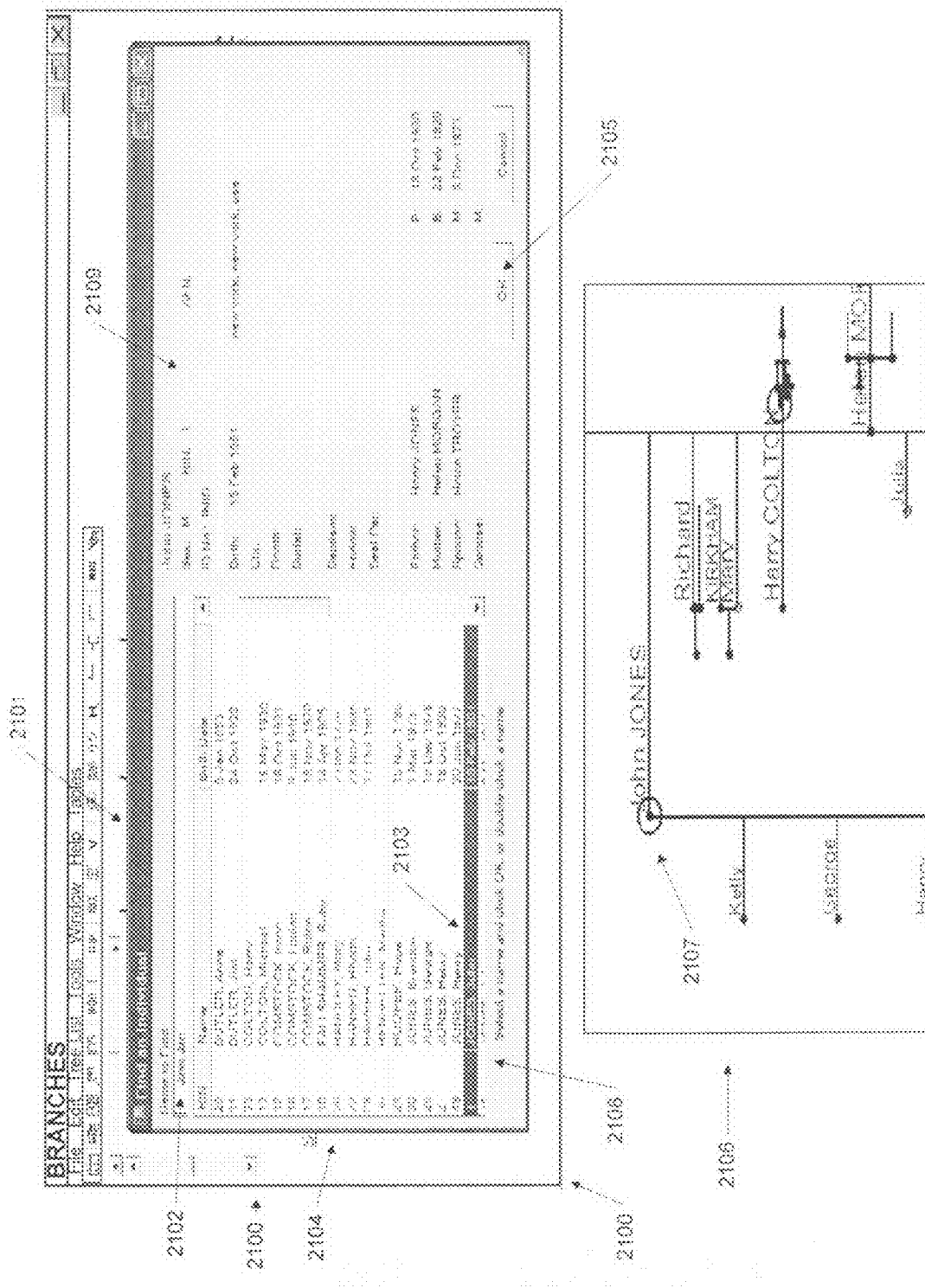
FIG. 21 illustrates the display in FIG. 1 in which a search for an individual is shown.

FIG. 21 illustrates two displays 2100 and 2106 demonstrating the search for an individual from a list feature. This allows the selection of an individual from a list and a graphic displayed on the EPD showing the location(s) of that individual. The feature is activated by selecting the search individual icon 1216 (FIG. 12) which displays a selection form 2104 listing individuals in the data base. The form is divided into two portions. The left portion 2108 lists the individuals in the database and the right portion 2109 shows individual information on the selected person 2102, 2103. A type-ahead feature is employed for selecting the individual by typing 2102. As the user types a character, the application attempts to guess what individual is desired, filling out the full name 2103 and highlighting the name 2103 in the name list 2108. When the correct individual has been selected, the user selects the OK button 2105 and the display 2106 appears. This display 2106 shows a representation of the EPD with a graphic circle(s) 2107 showing the exact location of the selected individual 2103. The user can then zoom in to see the detail for this individual.

Figure 22:
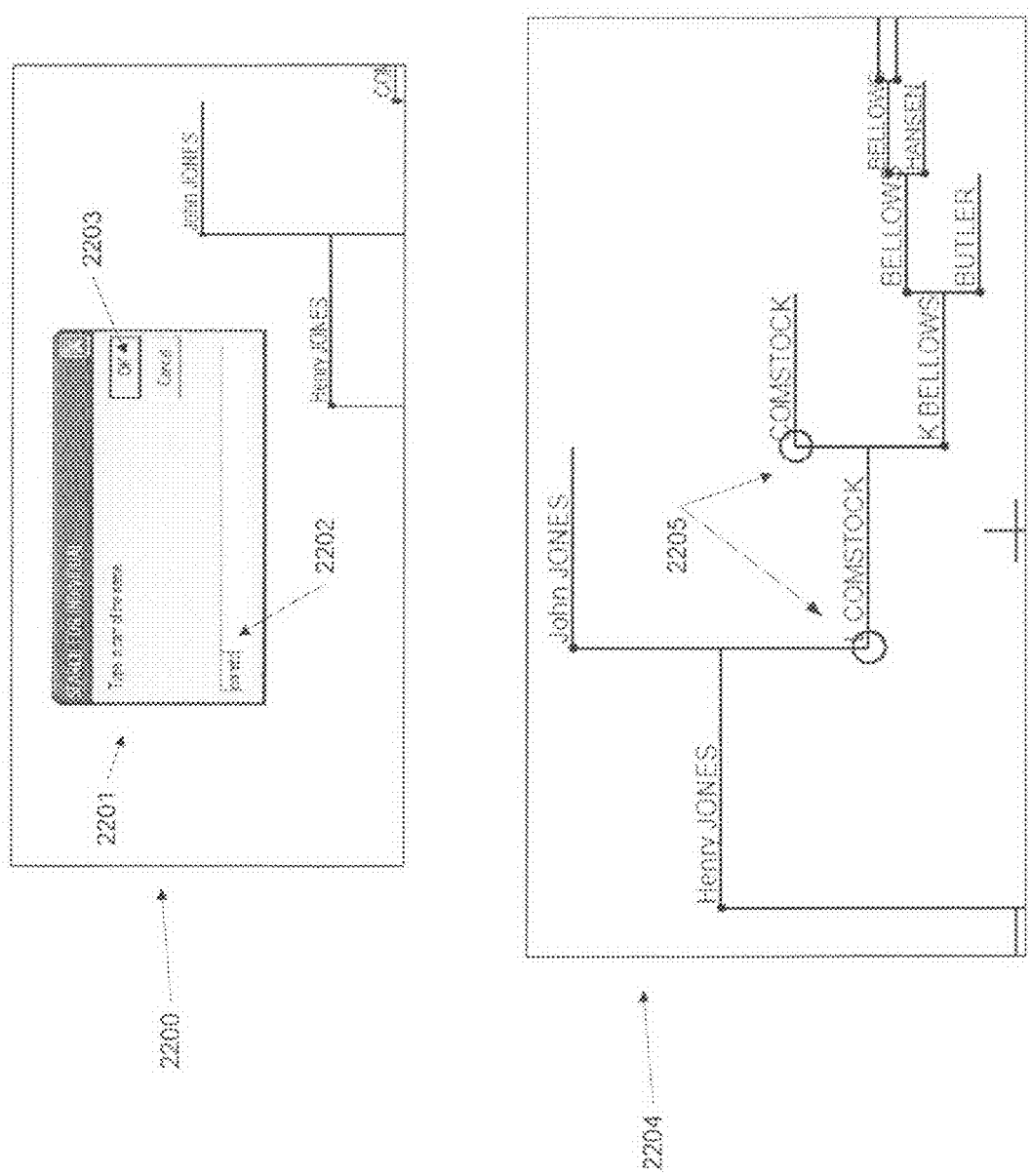
FIG. 22 illustrates the display in FIG. 1 in which search for individuals by partial name is shown.

FIG. 22 illustrates two displays 2200 and 2204 showing the individual search by partial name feature. This feature allows for searching the database for all individuals having the partial name input by the user. The feature is activated by selecting the search for individuals by partial name icon 1214 (FIG. 12). Upon selection, a form 2201 is displayed calling for the partial name 2202. Upon input of the partial name 2202 and selection of the OK button 2203, the EPD is displayed and all instances matching the input criteria 2202 are identified by a graphic circle 2205 showing the exact location of the individual(s).

Figure 23:
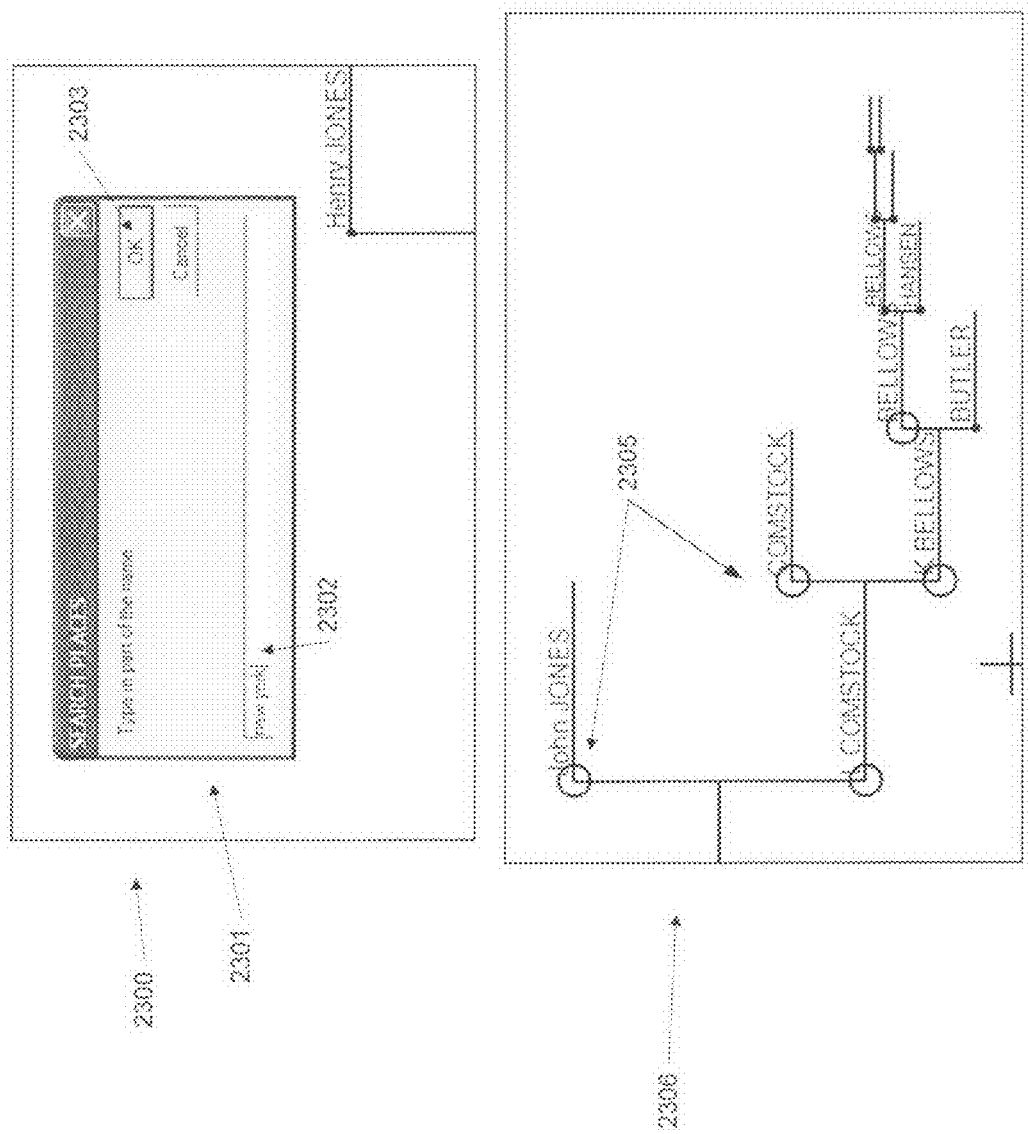
FIG. 23 illustrates the display in FIG. 1 in which a search by partial place name is shown.

FIG. 23 illustrates two displays 2300 and 2306 illustrating the feature of finding all individuals who have a partial place name in their linked event data. The feature is activated by selecting the partial place icon 1218 (FIG. 12), which then displays an input form 2301. The partial name 2302 and the pressing of the OK button 2303 produces the display 2306 showing an EPD with the positions of the selected data graphically identified by a graphic circle(s) 2305.

Figure 24:
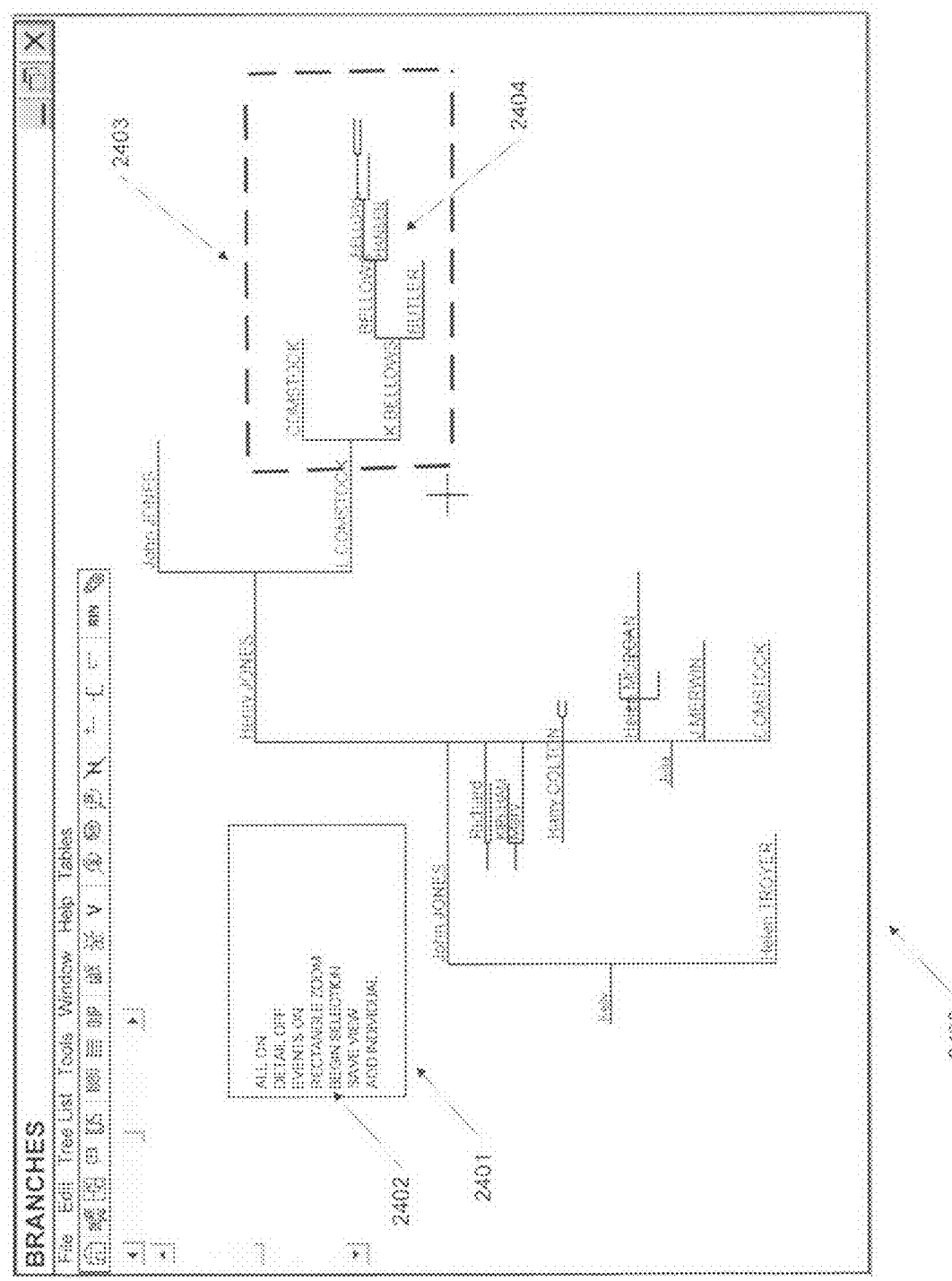
FIG. 24 illustrates the display which shows the method of selecting and deselecting data for inclusion or exclusion in an extraction or deletion from the database.

Of significant importance in the method of this invention is the inclusion of application software that in conjunction with the graphical representations generated by the invention allows the user to simply and graphically select portions of the database for exporting to another computer system or for deletion from the current database. FIG. 24 illustrates the fundamentals of the extraction/deletion methodology. The display 2400 shows the EPD for a hierarchically linked tree in the database. The feature is activated by clicking the right mouse button while positioned over a blank area, to cause a 2401 context menu to appear. From the context menu select the item 2402 BEGIN selection. The user can then select individuals and families to be exported/deleted by pressing and holding the left mouse button and dragging the mouse over the desired portion of the pedigree display. A 2403 dashed rectangle will indicate the area being selected during dragging. When the mouse button is released, the selected individuals and families will be 2404 highlighted in red. The user may create a new selection of individuals and families by repeating the drag operation, causing previously selected individuals and families to be deselected, and individuals and families within the new dashed rectangle to be selected. The user may also select additional individuals and families, after an initial selection is made, by performing a second drag operation while pressing and holding the keyboard control key. The keyboard control key can also be used to deselect a portion of the previously selected individuals and families using an additional drag operation.

FIG. 25 illustrates the export/delete function 2500 display. When the user has visually verified that the desired individuals and families are selected a 2501 context menu may be activated by clicking the right mouse button while positioned over a blank area. The user may then select one of the three options 2502 EXPORT Selected Individuals to GEDCOM file, 2503 EXPORT Selected Individuals to BRANCHES DB file, or 2504 PRUNE Selected individuals from BRANCHES DB file.

Figure 26:
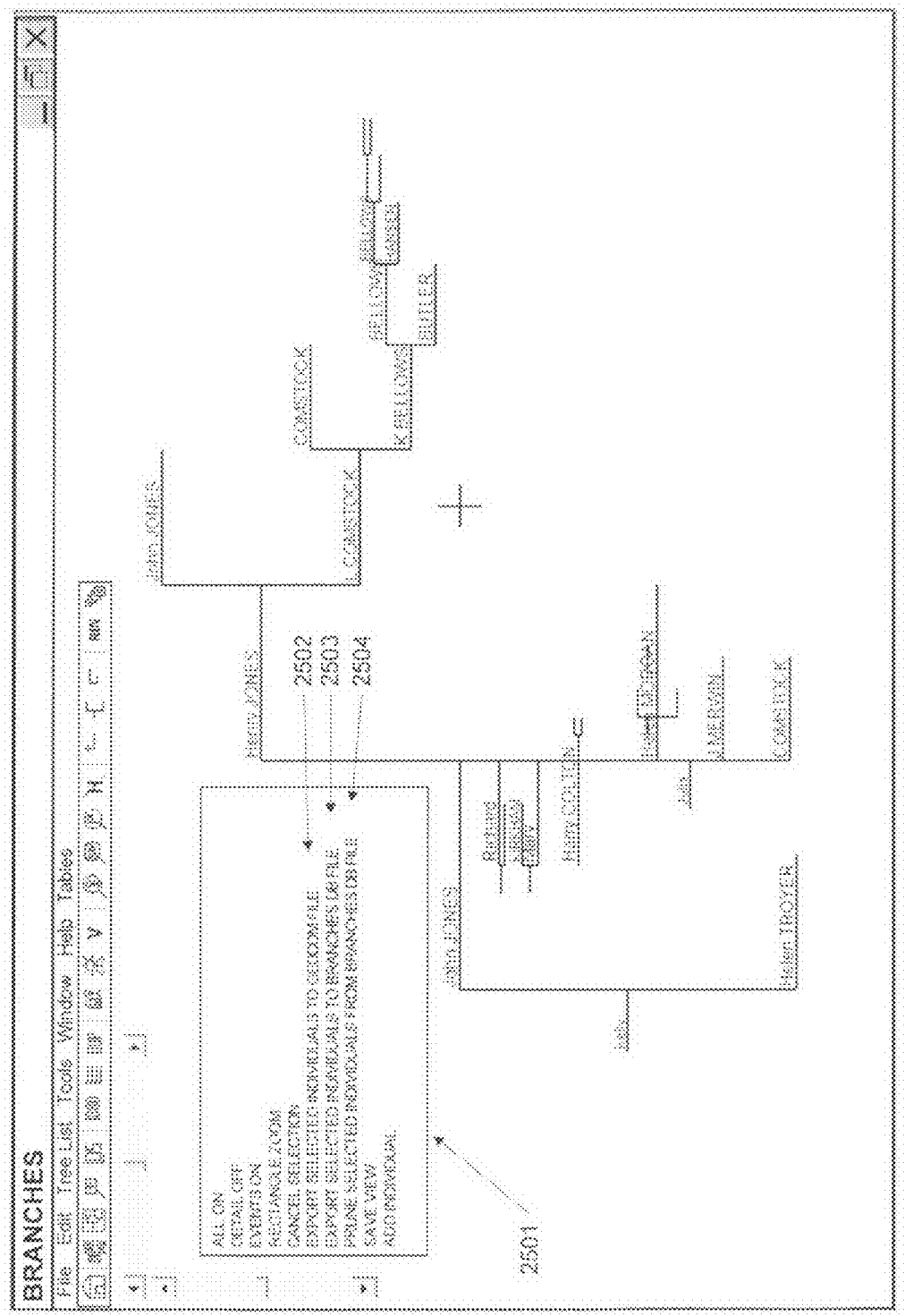
FIG. 26 illustrates the display in which an import from another database is performed.
Figure 26:
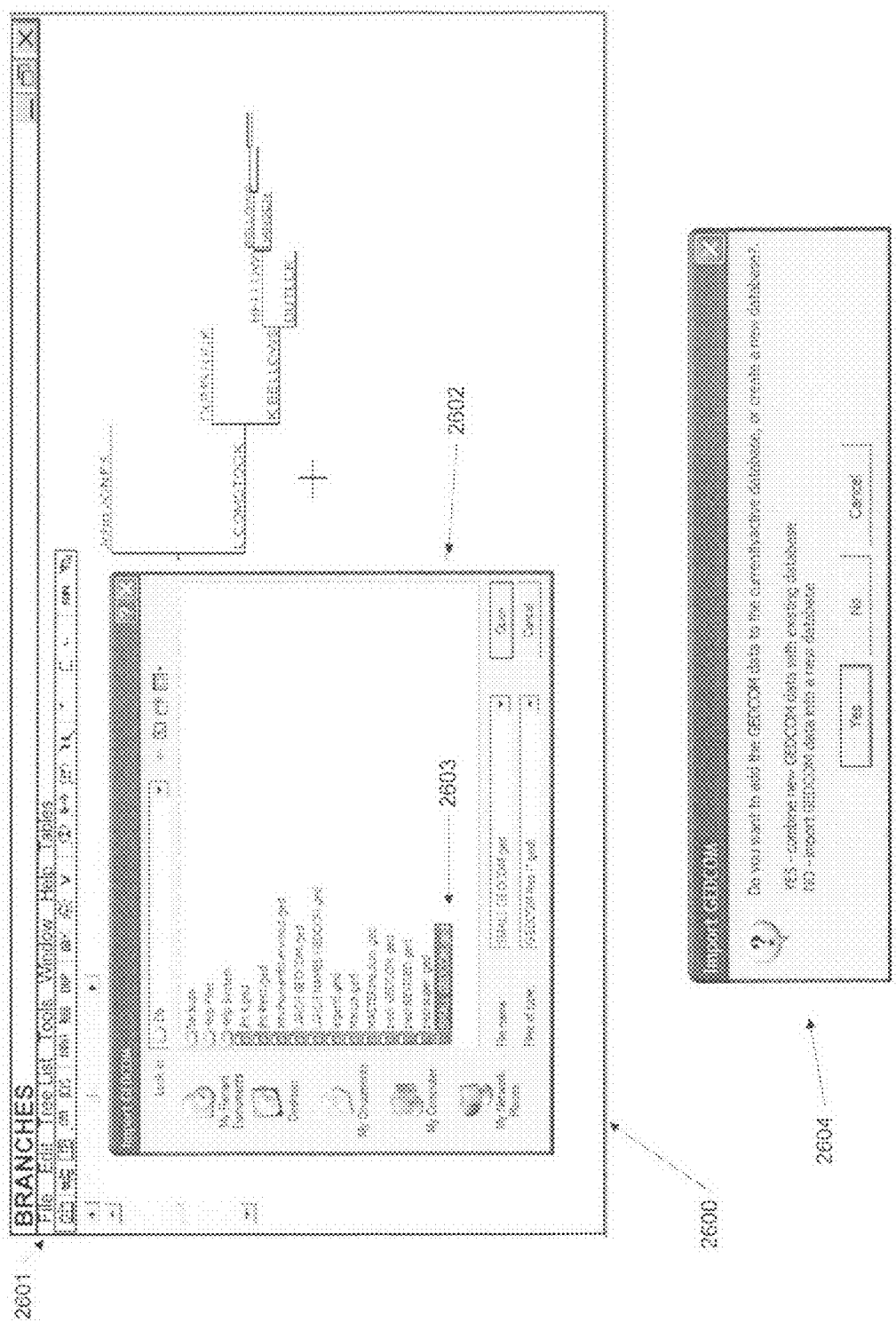

FIG. 26 illustrates a display 2600 showing the importing of data from an exterior source. The feature is activated through a menu selection from the menu bar 2601. A standard windows file selection form 2602 appears and a file 2603 for import is selected. Then another selection form 2604 asking whether the new file should be merged with the existing database or put in a new database.

Figure 27:
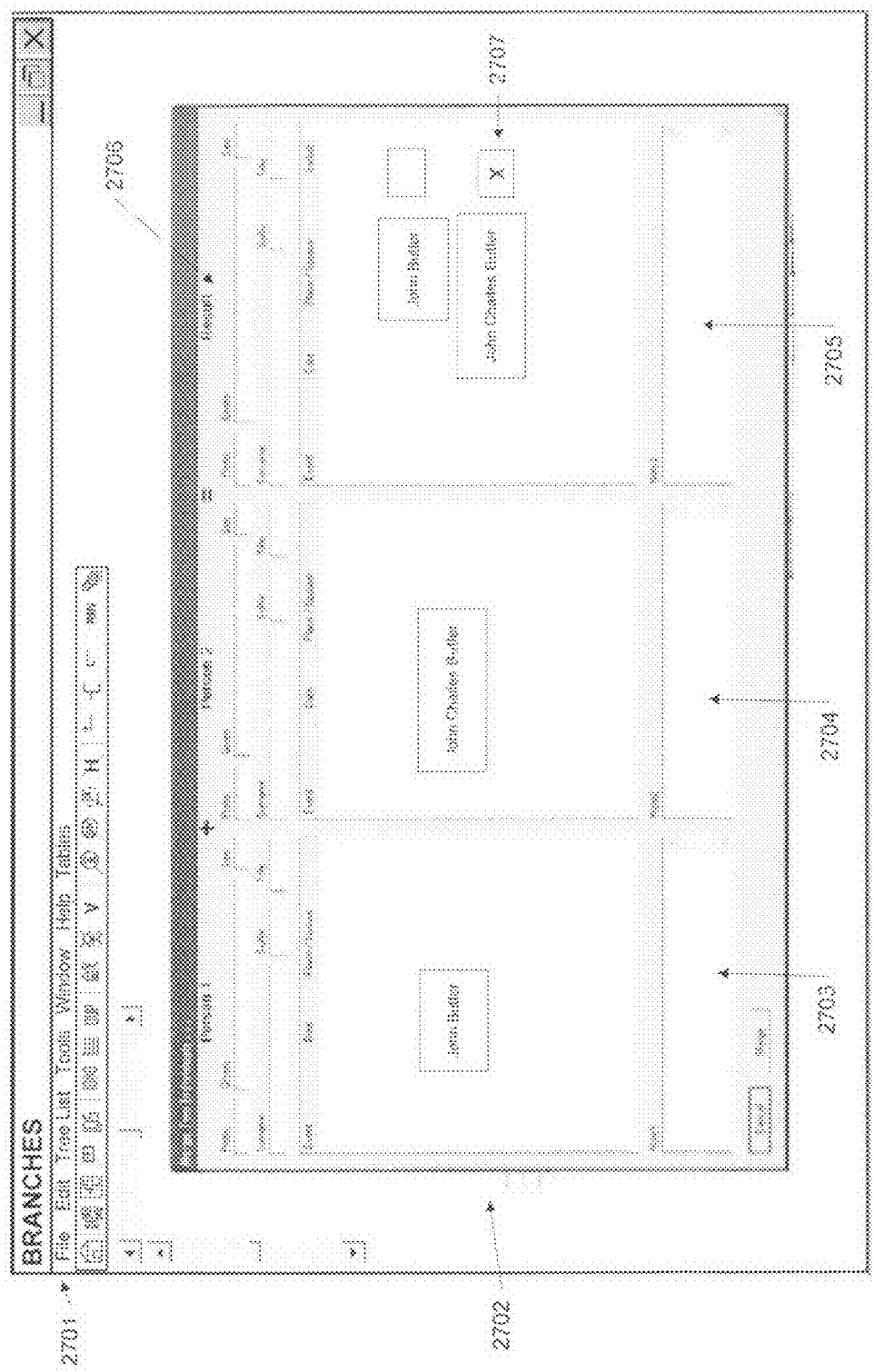
FIG. 27 illustrates the display in which individuals are merged into one record.

The merging of data in the database has been one of the most tedious and error prone processes in the genealogy industry. In particular, the merging of individuals required a decision as to which individual should be primary and which individual should be secondary. FIG. 27 illustrates a display 2700 showing a new method for comparing and merging data. The form 2702 appears when selected from the menu bar 2701 and is a graphic that is divided into three sections. The first section 2703 and the second section 2704 are the two individuals to be merged. This format is standard in the genealogy software industry. The third frame 2705, however, is unique to the invention. The frame 2705 contains the merged results 2706 of the other frames 2703 and 2704. This allows the user to see exactly what data is going to reside with the remaining individual. (In other words, the user can "preview" the change or merge that will be made before it is actually implemented). The user has control over what data will be retained and what data will be discarded by selecting which data will survive the merge by using the graphic selection boxes 2707. Unique to this invention is the method of retaining all data by default, even duplicate data, if the user makes no selections using the selection boxes 2707.

Figure 28:
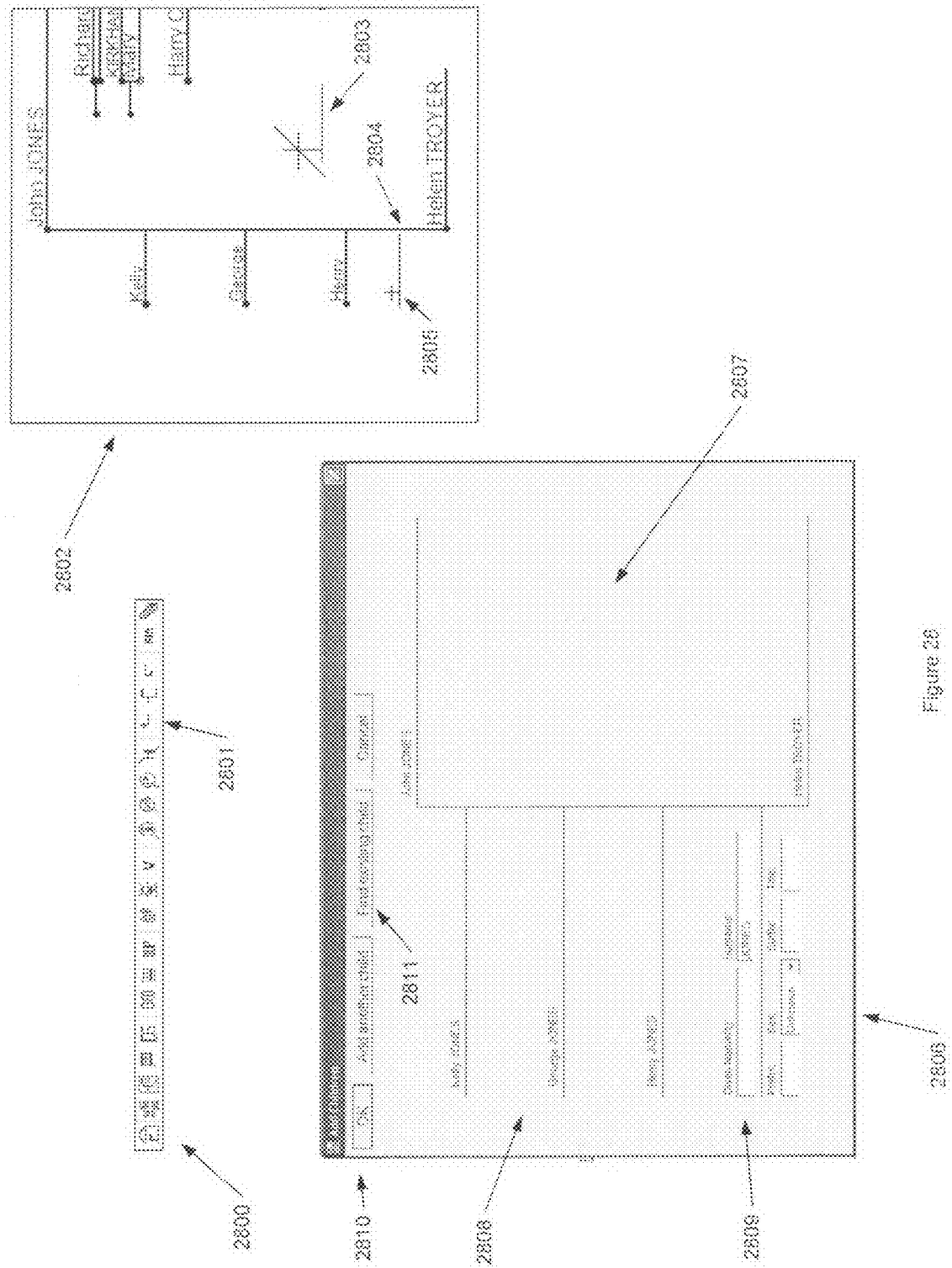
FIG. 28 illustrates the display in FIG. 1 in which individuals are added to the database.

Another area of confusion in the art is overcome by the invention's graphic method for adding individuals, families and spouses. FIG. 28 illustrates this method. To add a child, the user selects the "add a child" icon 2801 from the icon tool bar 2800. The standard cursor on the pedigree form 2802 is changed to a graphic cursor 2803 which the user can move around and place in the desired location. As the cursor 2803 moves, it changes from a "not allowed" cursor 2803 to an "allowed" cursor 2805 when it is over a valid location 2804 that will accept a child. When the cursor 2805 is over a valid location 2804, the user can click the mouse button and the "add Children" form 2806 appears. The form 2806 contains a graphic 2807 representing the family with existing children 2808. The form contains boxes 2809 for the input of the new child's names, sex, and titles. Other options 2810 are given at the top of the form 2806 including OK to save, add another child, find existing child and cancel. When the "find existing child" button 2811 is pressed, a selection form 2101 (FIG. 21) is displayed and the user is able to select a person who already resides in the database for inclusion in the selected family 2807.

Figure 29:
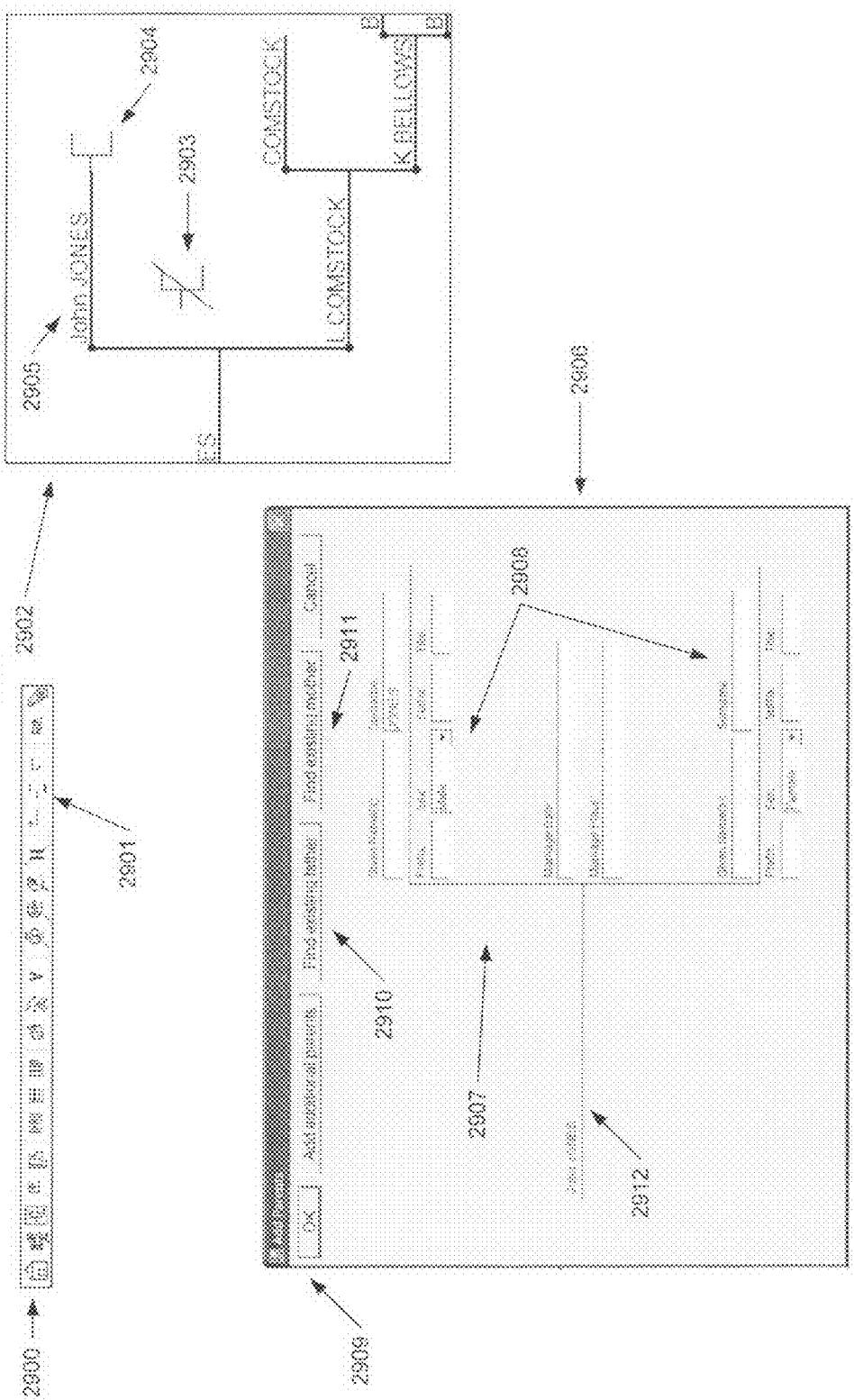
FIG. 29 illustrates the display in FIG. 1 in which families are added to the database.

FIG. 29 illustrates the method of adding parents to a linked pedigree tree. To add parents the user selects the "add a parent" icon 2901 from the icon tool bar 2900. The standard cursor on the pedigree form 2902 is changed to a graphic cursor 2903 which the user can move around and place in the desired location. As the cursor 2903 moves, it changes from a "not allowed" cursor 2903 to an "allowed" cursor 2904 when it is over a valid location 2905 that will accept an individual. When the cursor 2904 is over a valid location 2905, the user can click the mouse button and the "Add Parents" form 2906 appears. The form 2906 contains a graphic 2907 representing the family with existing children 2912. The form contains boxes 2908 for the input of the new father's and mother's names, and titles. Other options 2909 are given at the top of the form 2906 including OK to save, add additional parents, find existing father, find existing mother and cancel. When "find existing father" button 2910 or "find existing mother" button 2911 is pressed, a selection form is 2101 (FIG. 21) displayed and the user is able to select a person who already resides in the database for inclusion in the selected family.

Figure 30:
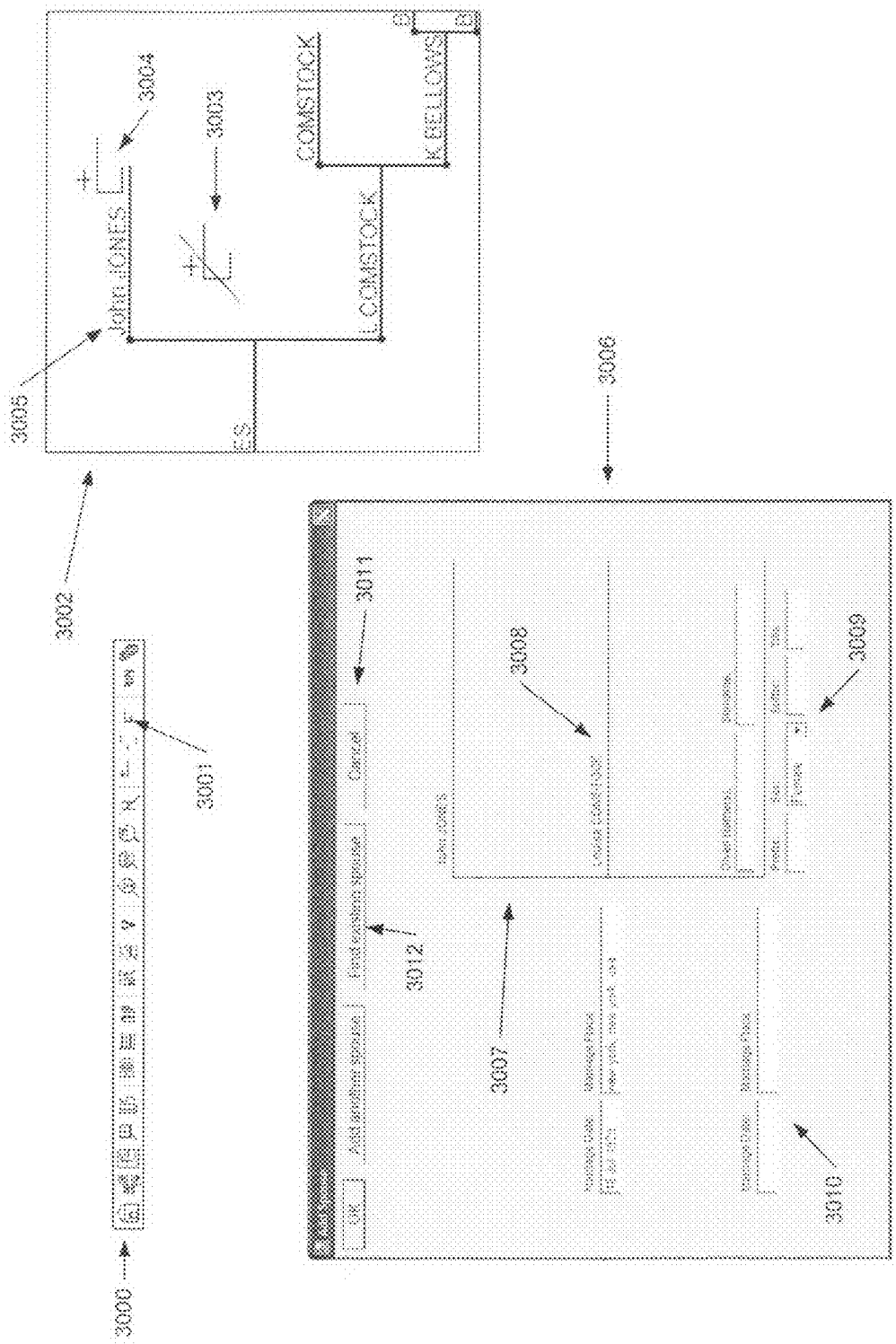
FIG. 30 illustrates the display in FIG. 1 in which multiple spouses are added to the database.

FIG. 30 illustrates the method of adding a spouse to a linked pedigree tree. To add a spouse the user selects the "add a spouse" icon 3001 from the icon tool bar 3000. The standard cursor on the pedigree form 3002 is changed to a graphic cursor 3003 which the user can move around and place in the desired location. As the cursor 3003 moves, it changes from a "not allowed" cursor 3003 to an "allowed" cursor 3004 when it is over a valid location 3005 that will accept an individual. When the cursor 3004 is over a valid location 3005, the user can click the mouse button and the "Add Spouse" form 3006 appears. The form 3006 contains a graphic 3007 representing the husband or wife with existing spouse(s) 3008. The form contains boxes 3009 for the input of the new spouse's names, sex, and titles. Additional boxes 3010 for the input of marriage information are displayed. Other options 3011 are given at the top of the form 3006 including OK to save, add another spouse, find existing spouse and cancel. When the "find existing spouse" button 3012 is pressed, a selection form 2101 (FIG. 21) is displayed and the user is able to select a person who already resides in the database for inclusion in the selected family.

Figure 31:
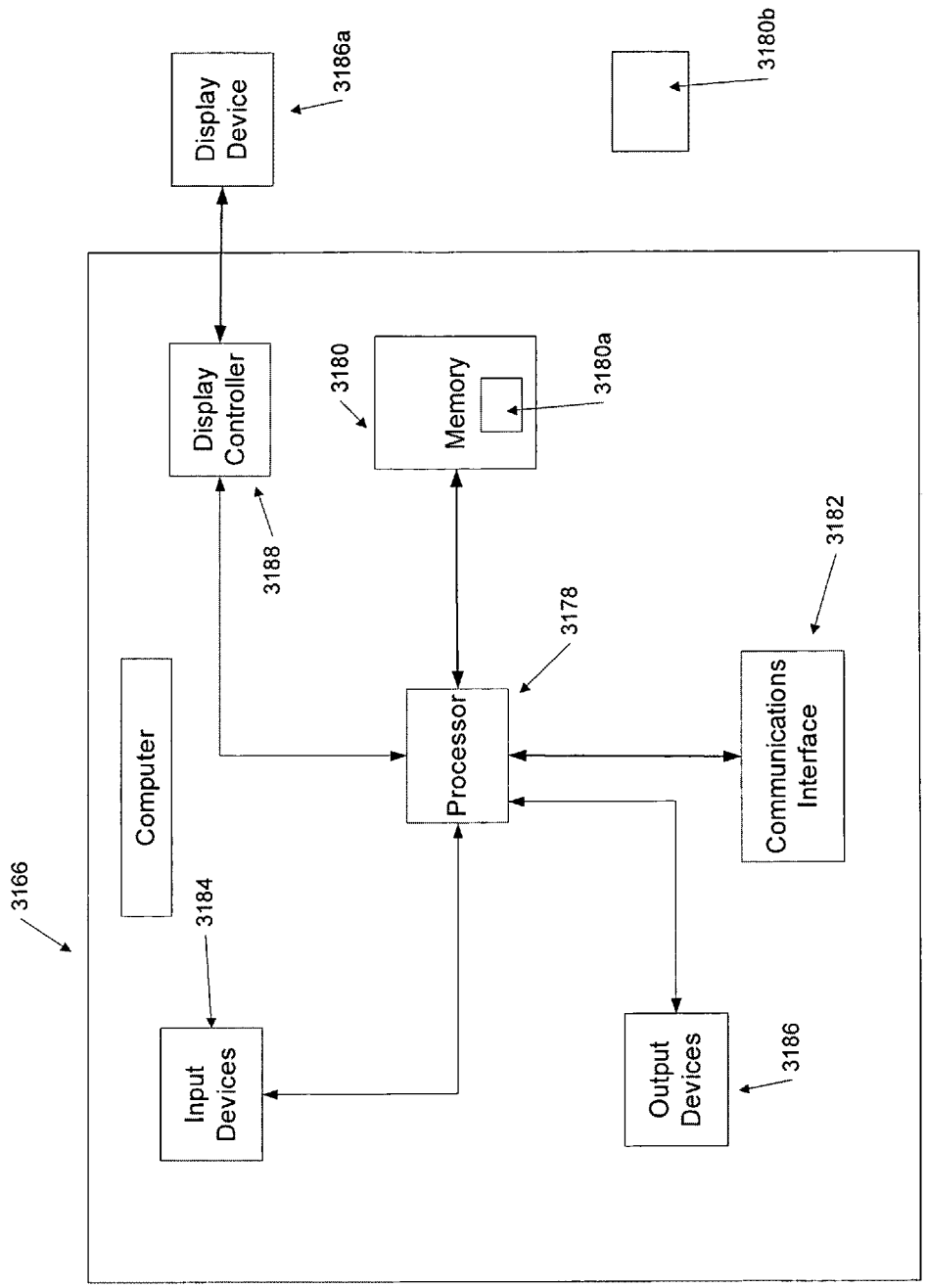
FIG. 31 represents a schematic view of a computer system that may be used to implement the present embodiments.

FIG. 31 is a schematic view of a computer system that may be used with the present embodiments. Many different types of computers and computer components may be used to implement the computers discussed herein. The components shown in FIG. 31 may be located within the same physical structure or in separate housing or structures. The computer 3166 may include a processor 3178 and a memory 3180.

The processor 3178 controls the operation of the computer 3166 and may be embodied as a microprocessor, a microcontroller, a digital signal processor (DSP) or other device known in the art. The processor 3178 typically performs logical and arithmetic operations based on program instructions stored within the memory 3180.

As used herein, the term memory 3180 is broadly defined as any electronic component capable of storing electronic information, and may be embodied as read only memory (ROM), random access memory (RAM), magnetic disk storage media, optical storage media, flash memory devices in RAM, on-board memory included with the processor 3178, EPROM memory, EEPROM memory, registers, etc. The memory 3180 typically stores program instructions and other types of data. The program instructions may be executed by the processor 3178 to implement some or all of the methods disclosed herein. This memory may be used to store the computer code used to execute the methods disclosed herein. (Such code may be executed by the processor 3178 as known in the art).

The memory 3180 includes code 3180a, which is executable computer code, that will be executed to run the computer programs and functions discussed herein. Those skilled in the art will appreciate how this code may be written and constructed. The code 3180a is stored in the memory and executed by the processor 3178. The code 3180a may have been initially stored on a product 3180b and then loaded onto the computer 3166. For example, this product may be a CD that loads the code. In other situations, the code 3186a may be downloaded from the Internet, or loaded onto the computer using other known techniques. In other embodiments, the code 3180a may be cached on the hard drive the machine and run, as known in the art.

The computer system 3166 typically also includes one or more communication interfaces 3182 for communicating with other electronic devices. The communication interfaces 3182 may be based on wired communication technology, wireless communication technology, or both. Examples of different types of communication interfaces 3182 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The communications interface 3182 is designed such that it allows the computer 3166 to communicate with the network (not shown) and/or other computers (such as, for example, via the Internet). Additionally, the communications interface 3182 may be in communication with one or more external devices (not shown). These external devices may be any electronic device, as desired. Specific embodiments may be constructed in which the external device comprises the printer, etc.

The computer system 3166 typically also includes one or more input devices 3184 and one or more output devices 3186. Examples of different kinds of input devices 3184 include a keyboard, mouse, microphone, remote control device, button, joystick, trackball, touchpad, lightpen, etc. Examples of different kinds of output devices 3186 include a speaker, printer, etc. One specific type of output device which is typically used with a computer system is a display device 3186a (which is sometimes called a "monitor"). Display devices 3186a used with embodiments disclosed herein may utilize any suitable image projection technology, such as a cathode ray tube (CRT), liquid crystal display (LCD), light-emitting diode (LED), gas plasma, electroluminescence, or the like.

A display controller 3188 may also be provided, for converting data stored in the memory 3180 into text, graphics, and/or moving images (as appropriate) shown on the display device 3186a. Of course, FIG. 31 illustrates only one possible configuration of a computer system 3166. Various other architectures and components may be utilized. Further embodiments may be constructed in which one or more of the above-recited components are omitted from the computer 3166.

It should also be noted that, as used herein, information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

The invention claimed is:

1. A method for displaying hierarchical linked genealogical data stored within a database, the method comprising:

displaying an entirety of the hierarchical linked genealogical data in an enhanced pedigree display on a computer screen showing all relationships graphically by vertical and horizontal lines which diminish in size further from a root node person; wherein an orientation and location of the lines indicates the relationship of connected individuals; wherein by changing the root node individual, the display adjusts to show all connected individuals from the perspective of a new root node individual; and wherein the vertical and horizontal lines which diminish in size further from the root node person comprise lines representing additional spouses, additional parents, and children's spouses of persons represented within enhanced pedigree display if such relationships are present in the hierarchical linked genealogical data; and displaying, upon activation of a control, a line between duplicate representations of an individual shown within the enhanced pedigree display, if any duplicate representations are presented therein.

2. A method as in claim 1 further comprising displaying a mini-map image, the mini-map image showing a representation of all of the hierarchical linked genealogical data, the mini-map image indicating where a portion of the hierarchical linked genealogical data being displayed fits within the entire hierarchical linked genealogical data.

3. A method as in claim 1 wherein data may be displayed, modified, added, and deleted, on the enhanced pedigree display, including names, places, and event data such as data related to birth, marriage, death, religious events, photographs and scanned images.

4. A method as in claim 1 wherein multiple pedigree trees selected from a list of all unlinked trees in the database, as well as multiple views of a single pedigree tree based on the selection of different root node individuals, may be displayed simultaneously.

5. A method as in claim 1 further comprising the step of reviewing data to determine if individuals listed in the enhanced pedigree display are duplicates.

6. A method as in claim 1 wherein the aspect ratio, scale and position of the enhanced pedigree display are changeable by a user, or a portion of the enhanced pedigree display is graphically selectable for enlargement.

7. A method as in claim 1 further comprising the step of modifying the enhanced pedigree display, wherein changes to be made and results of merging data are previewable before the modifications are implemented.

8. A method as in claim 1 further comprising the step of selecting a portion of the pedigree display for deletion, or exporting to another computer system.

9. A non-transitory computer-program product for organizing and using hierarchical linked genealogical data, the computer-program product comprising a computer readable medium having instructions thereon, the instructions comprising:

code for displaying an entirety of the hierarchical linked genealogical data in an enhanced pedigree display form on a computer screen showing all relationships graphically by vertical and horizontal lines which diminish in size further from a root node person; wherein the orientation and location of the lines indicates the relationship of the connected individuals; and wherein the vertical and horizontal lines which diminish in size further from the root node person comprise lines representing additional spouses, additional parents, and children's spouses of persons represented within enhanced pedigree display if such relationships are present in the hierarchical linked genealogical data;

code for configuring the enhanced pedigree display to automatically adjust the display if a different root node individual is selected; and code for displaying, upon activation of a control, a line between duplicate representations of an individual shown within the enhanced pedigree display, if any duplicate representations are presented therein.

10. A computer program product as in claim 9 further comprising code for displaying a mini-map image, the mini-map image showing a representation of all of the hierarchical linked genealogical data, the mini-map image indicating where the portion of the hierarchical linked genealogical data being displayed fits on the entire hierarchical linked genealogical data.

11. A computer-program product as in claim 9 wherein data may be displayed, modified, added, and deleted, on the enhanced pedigree display, including names, places, and event data such as data related to birth, marriage, death, religious events, photographs and scanned images.

12. A computer program product as in claim 9 wherein multiple pedigree trees selected from a list of all unlinked trees in the database, as well as multiple views of a single pedigree tree based on the selection of different root node individuals, may be displayed simultaneously.

13. A computer-program product as in claim 9 further comprising code capable of reviewing data to determine if individuals listed in the enhanced pedigree display are duplicates.

14. A computer-program product as in claim 9 further comprising computer code enabling user alteration of the aspect ratio, scale and position of the enhanced pedigree display, or graphical selection of a portion of the enhanced pedigree display for enlargement.

15. A computer-program product as in claim 9 further comprising code capable of allowing the data on the enhanced pedigree display to be modified, wherein the code enabling a preview of changes to be made and results of merging data before the modifications are implemented.

16. A computer-program product as in claim 9 comprising code capable of allowing the user to select a portion of the pedigree display for deletion, or exporting to another computer system.

* * * * *